United States Patent
Fujii

(10) Patent No.: US 12,425,730 B2
(45) Date of Patent: Sep. 23, 2025

(54) IMAGING APPARATUS AND SIGNAL PROCESSING METHOD FOR HANDLING SATURATION OF SPLIT PIXEL

(71) Applicant: SONY GROUP CORPORATION, Tokyo (JP)

(72) Inventor: Shinichi Fujii, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 145 days.

(21) Appl. No.: 18/256,388

(22) PCT Filed: Jun. 18, 2021

(86) PCT No.: PCT/JP2021/023240
§ 371 (c)(1),
(2) Date: Jun. 7, 2023

(87) PCT Pub. No.: WO2022/130662
PCT Pub. Date: Jun. 23, 2022

(65) Prior Publication Data
US 2024/0022813 A1    Jan. 18, 2024

(30) Foreign Application Priority Data
Dec. 17, 2020 (JP) .................. 2020-209466

(51) Int. Cl.
*H04N 23/67* (2023.01)
*H04N 23/80* (2023.01)
(Continued)

(52) U.S. Cl.
CPC .......... *H04N 23/672* (2023.01); *H04N 23/80* (2023.01); *H04N 23/81* (2023.01); *H04N 25/62* (2023.01)

(58) Field of Classification Search
CPC ...... H04N 23/672; H04N 23/81; H04N 25/62; H04N 25/704; G02B 7/34
See application file for complete search history.

(56) References Cited

U.S. PATENT DOCUMENTS

2004/0179128 A1    9/2004  Oikawa
2013/0235276 A1*  9/2013  Ogawa ................ H04N 25/704
                                                        348/703
(Continued)

FOREIGN PATENT DOCUMENTS

JP    2004-191629 A    7/2004
JP    2012220790 A    11/2012
(Continued)

OTHER PUBLICATIONS

International Search Report and Written Opinion of PCT Application No. PCT/JP2021/023240, issued on Sep. 21, 2021, 10 pages of ISRWO.

*Primary Examiner* — Gevell V Selby
(74) *Attorney, Agent, or Firm* — CHIP LAW GROUP

(57) ABSTRACT

Provided is an imaging apparatus including an imaging element that includes photodiode split pixels, the photodiode split pixels each including a first photodiode pixel and a second photodiode pixel, the first photodiode pixel and the second photodiode pixel outputting different pixel signals, respectively, a signal processing section that, in a case where output values of the pixel signals reach saturation values, performs a saturation handling process of correcting the output values according to the saturation values and predicted output values.

10 Claims, 16 Drawing Sheets

(51) Int. Cl.
*H04N 23/81* (2023.01)
*H04N 25/62* (2023.01)

(56) References Cited

U.S. PATENT DOCUMENTS

2014/0333819 A1* 11/2014 Aoki ................ H04N 23/73
348/333.09
2016/0006925 A1* 1/2016 Yamada ............. H04N 23/672
348/703
2016/0018721 A1* 1/2016 Okazawa ........... H04N 23/843
348/345

FOREIGN PATENT DOCUMENTS

| JP | 2014142497 A | 8/2014 |
| JP | 2015-142364 A | 8/2015 |
| JP | 2015-163915 A | 9/2015 |
| JP | 2015212772 A | 11/2015 |
| JP | 2016-109938 A | 6/2016 |
| JP | 2017022528 A | 1/2017 |
| JP | 2017040704 A | 2/2017 |
| JP | 2019-121972 A | 7/2019 |

* cited by examiner

IDEAL

REAL

AFTER PUPIL IMBALANCE CORRECTION

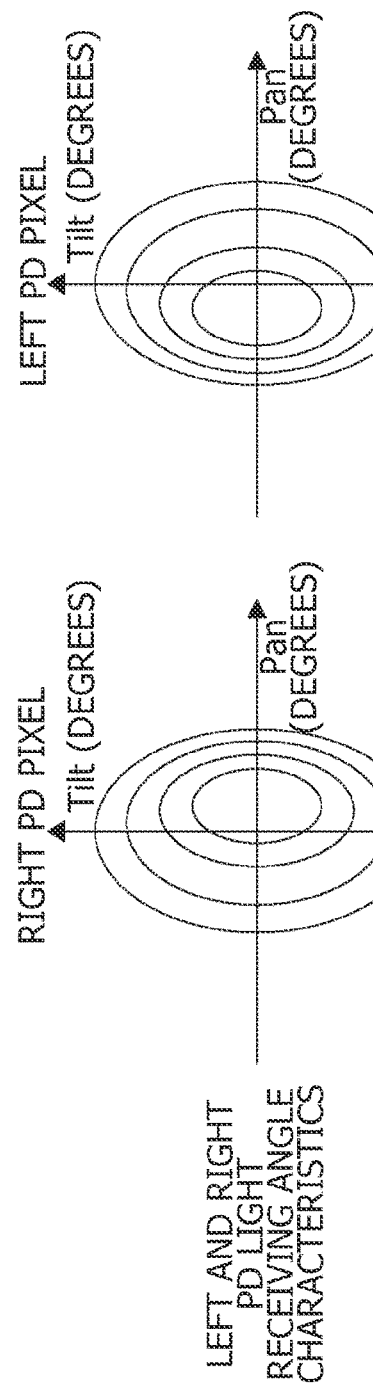
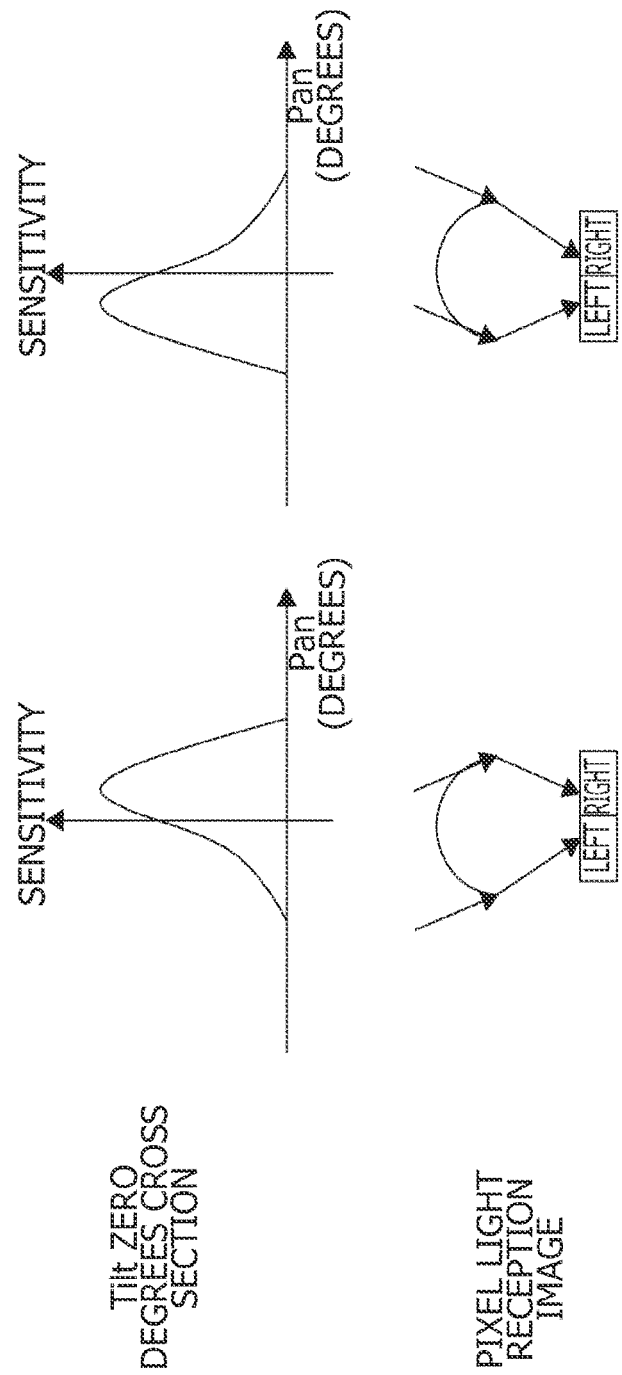
FIG. 14A  LEFT AND RIGHT PD LIGHT RECEIVING ANGLE CHARACTERISTICS
FIG. 14B  Tilt ZERO DEGREES CROSS SECTION
FIG. 14C  PIXEL LIGHT RECEPTION IMAGE

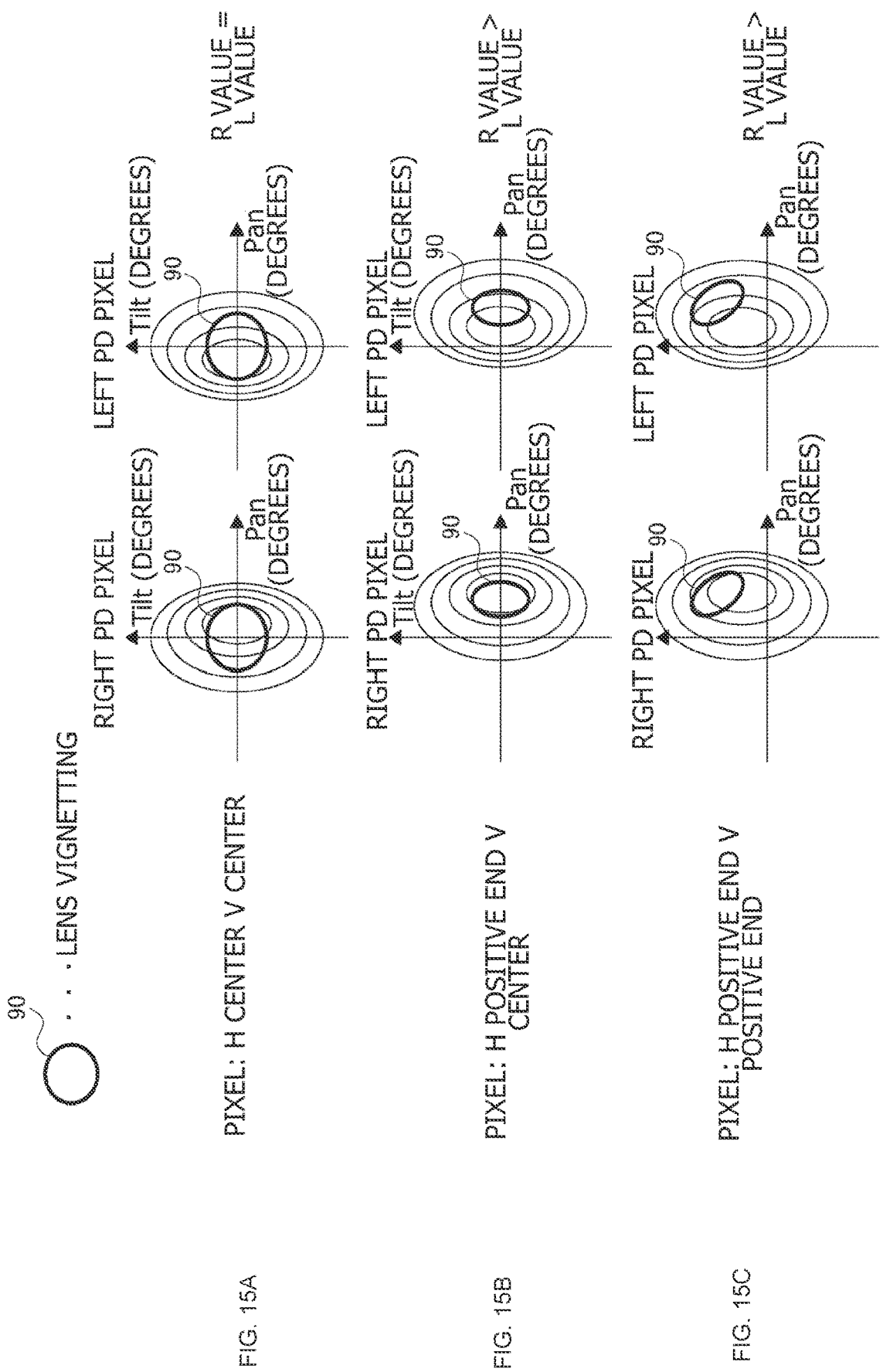

IMAGING APPARATUS AND SIGNAL PROCESSING METHOD FOR HANDLING SATURATION OF SPLIT PIXEL

CROSS REFERENCE TO RELATED APPLICATIONS

This application is a U.S. National Phase of International Patent Application No. PCT/JP2021/023240 filed on Jun. 18, 2021, which claims priority benefit of Japanese Patent Application No. JP 2020-209466 filed in the Japan Patent Office on Dec. 17, 2020. Each of the above-referenced applications is hereby incorporated herein by reference in its entirety.

TECHNICAL FIELD

The present technology relates to an imaging apparatus including an imaging element having a pixel group configured to output a phase difference signal, and also relates to a signal processing method for the imaging apparatus.

BACKGROUND ART

In order to provide autofocus (hereinafter may be referred to as "AF") control, some imaging apparatuses have a function for acquiring focus information regarding a subject. For example, an imaging apparatus including an imaging element having pixels for focus detection is known.

Disclosed in PTL 1 is a technology that is capable of detecting a focus by performing computation on a signal saturated (overflowed) irrespective of the symmetry of pupil division with a value of the signal replaced with its limit value in a case where a plurality of image signals to which pupil division is applied by an imaging element is read out to detect the focus.

CITATION LIST

Patent Literature

[PTL 1]
Japanese Patent Laid-open No. 2016-109938

SUMMARY

Technical Problem

A known method for detecting an in-focus state is to turn one image-forming pixel into a photodiode (hereinafter may be referred to as "PD") split pixel. The PD split pixel is configured as a pair of PD pixels that is split left and right.

In the case of the PD split pixel, a plurality of image signals (pixel values) to which pupil division is applied can be read out. However, in a case where an overflow occurs in one of the PD pixels, a balance between the output values of the left and right PD pixels differs from an original state, so that a defocus amount cannot be accurately determined. The method described in PTL 1, which is mentioned above, makes it possible to conduct focus detection with respect to a saturated signal, but does not achieve sufficient detection accuracy.

In view of the above circumstances, the present technology is designed to achieve sufficient detection accuracy even in a case where an overflow occurs in an imaging element having PD split pixels.

Solution to Problem

An imaging apparatus provided by the present technology includes an imaging element and a signal processing section. The imaging element includes photodiode split pixels each including a first photodiode pixel and a second photodiode pixel. The first photodiode pixel and the second photodiode pixel output different pixel signals, respectively. The signal processing section performs a saturation handling process in a case where output values of the pixel signals reach saturation values. The saturation handling process is performed to correct the output values according to the saturation values and predicted output values.

The output values of the image signals from the photodiode (PD) pixels are limited by a saturation threshold, namely, the maximum value, when the amount of electric charge due to light reception overflows. Therefore, in a case where the overflow occurs, the output values of the PD pixels are not accurate values. In such a case, the saturation handling process is performed to correct the output values.

In the above-described imaging apparatus provided by the present technology, it is conceivable that the saturation handling process may include a process of calculating difference values between the predicted output values and the saturation values.

The differences between the predicted output values and the saturation values are calculated and used to correct the output values.

In the above-described imaging apparatus provided by the present technology, it is conceivable that the saturation handling process may be performed on one photodiode pixel of the first photodiode pixel and the second photodiode pixel to calculate the difference values between the predicted output values and the saturation values.

In the photodiode split pixels, an overflow event may occur in the photodiode pixel on one side. In order to handle such a situation, the difference between the predicted output value and the saturation value is calculated and used to correct the output value of the overflowed photodiode pixel.

In the above-described imaging apparatus provided by the present technology, it is conceivable that the saturation handling process may be performed to not only add the difference value calculated of the one photodiode pixel to the output value of the one photodiode pixel but also subtract the difference value from the output value of the other photodiode pixel.

The photodiode split pixels may be structured in such a manner that, in a case where one of the photodiode pixels overflows, the resulting excess amount of electric charge leaks into the other photodiode pixel. In such a case, the resulting leakage is corrected.

It is conceivable that the above-described imaging apparatus provided by the present technology may include a control section. The control section determines an in-focus state and causes the signal processing section to perform the saturation handling process according to the in-focus state.

The saturation handling process is performed when the in-focus state is nearly reached by an autofocus operation.

In the above-described imaging apparatus provided by the present technology, it is conceivable that the control section may provide autofocus control on the basis of the defocus amount determined by using the output value of the first photodiode pixel and the output value of the second photodiode pixel in a state where the signal processing section is not allowed to perform the saturation handling process, and then, in a state where the signal processing section is allowed to perform the saturation handling process after an in-focus condition is satisfied, may provide autofocus control based on the defocus amount determined by using the output value of the first photodiode pixel and the output value of the second photodiode pixel.

First of all, autofocus control is provided without performing the saturation handling process in order to roughly approach the in-focus state, and then autofocus control is provided in a state where the saturation handling process is performed.

In the above-described imaging apparatus provided by the present technology, it is conceivable that the predicted output values may be values determined based on the light receiving angle characteristics of the first and second photodiode pixels and on lens information.

The light receiving angle characteristics are known. Therefore, the predicted output values are determined by acquiring lens vignetting information or other lens information regarding an attached lens barrel.

It is conceivable that the above-described imaging apparatus provided by the present technology may be an imaging apparatus to which an interchangeable lens barrel can be attached, and that the lens information may be received from the attached lens barrel.

In a case where a replaceable lens is used, the lens information is acquired from the associated lens barrel in order to be able to determine the predicted output values.

In the above-described imaging apparatus provided by the present technology, it is conceivable that the signal processing section may make pupil imbalance correction of the output values of the first and second photodiode pixels in order to smooth output value fluctuations due to an image height.

Pupil imbalance correction is made to correct the output values to obtain flat characteristics irrespective of the image height.

In the above-described imaging apparatus provided by the present technology, it is conceivable that the signal processing section may make the pupil imbalance correction of the output values of the first and second photodiode pixels subjected to the saturation handling process.

Pupil imbalance correction is made on the output values in which an overflow is reflected by the saturation handling process.

A signal processing method provided by the present technology is used by an imaging apparatus including an imaging element. The imaging element includes photodiode split pixels each including a first photodiode pixel and a second photodiode pixel. The first photodiode pixel and the second photodiode pixel output different pixel signals, respectively. In a case where the output values of the pixel signals reach saturation values, the imaging apparatus performs a saturation handling process of correcting the output values according to the saturation values and predicted output values.

This optimizes the output values when a saturation occurs.

BRIEF DESCRIPTION OF DRAWINGS

FIGS. 14A, 14B, and 14C illustrate explanatory diagrams of the light receiving angle characteristics of the PD split pixels.

FIGS. 15A, 15B, and 15C illustrate explanatory diagrams of a relation between lens vignetting and light receiving angle characteristics.

DESCRIPTION OF EMBODIMENT

An embodiment of the present technology will now be described in the following order with reference to the accompanying drawings.

<1. Configuration of Imaging Apparatus>
<2. Overflow and Saturation Handling Process>
<3. AF Control Process>
<4. Summary and Modifications>

1. CONFIGURATION OF IMAGING APPARATUS

Figure 1:
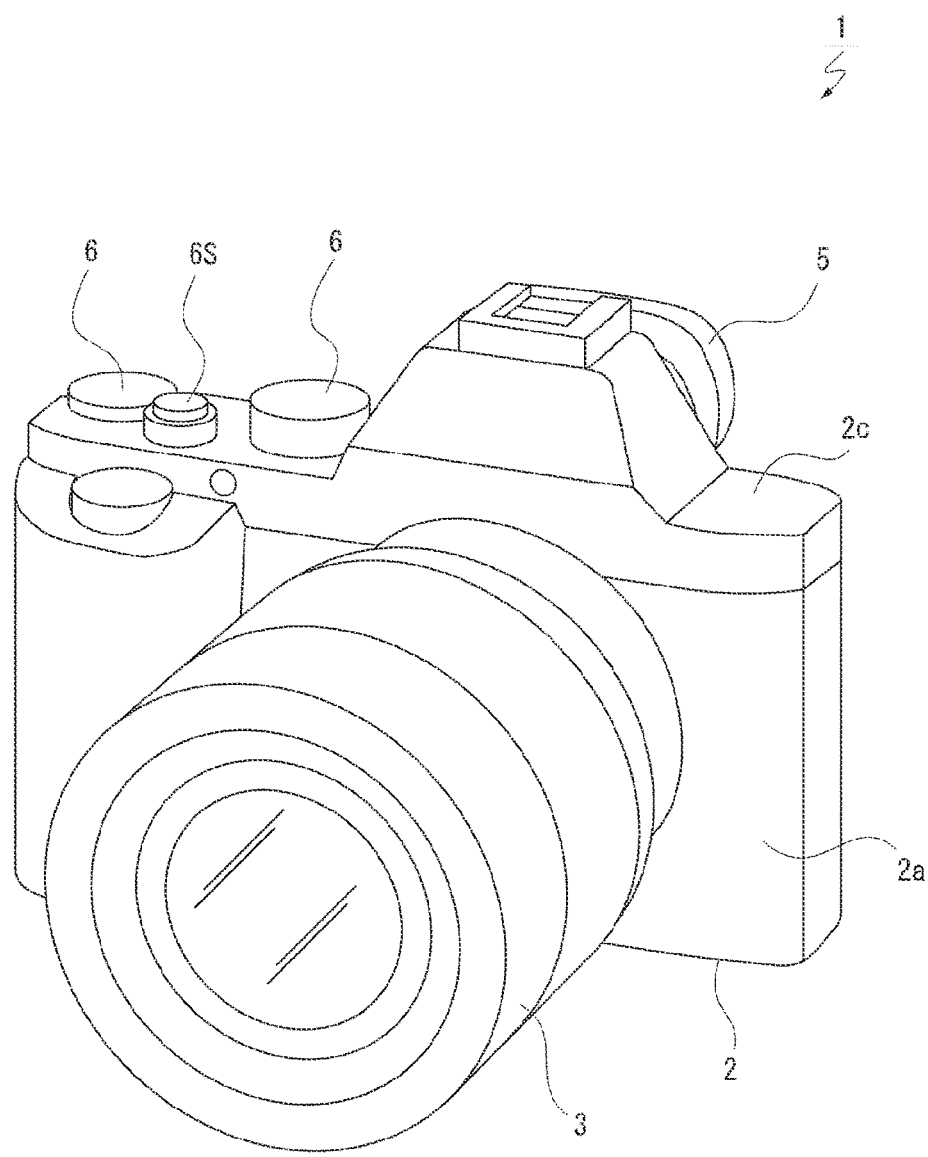
FIG. 1 is a perspective view of an imaging apparatus according to an embodiment of the present technology.
Figure 2:
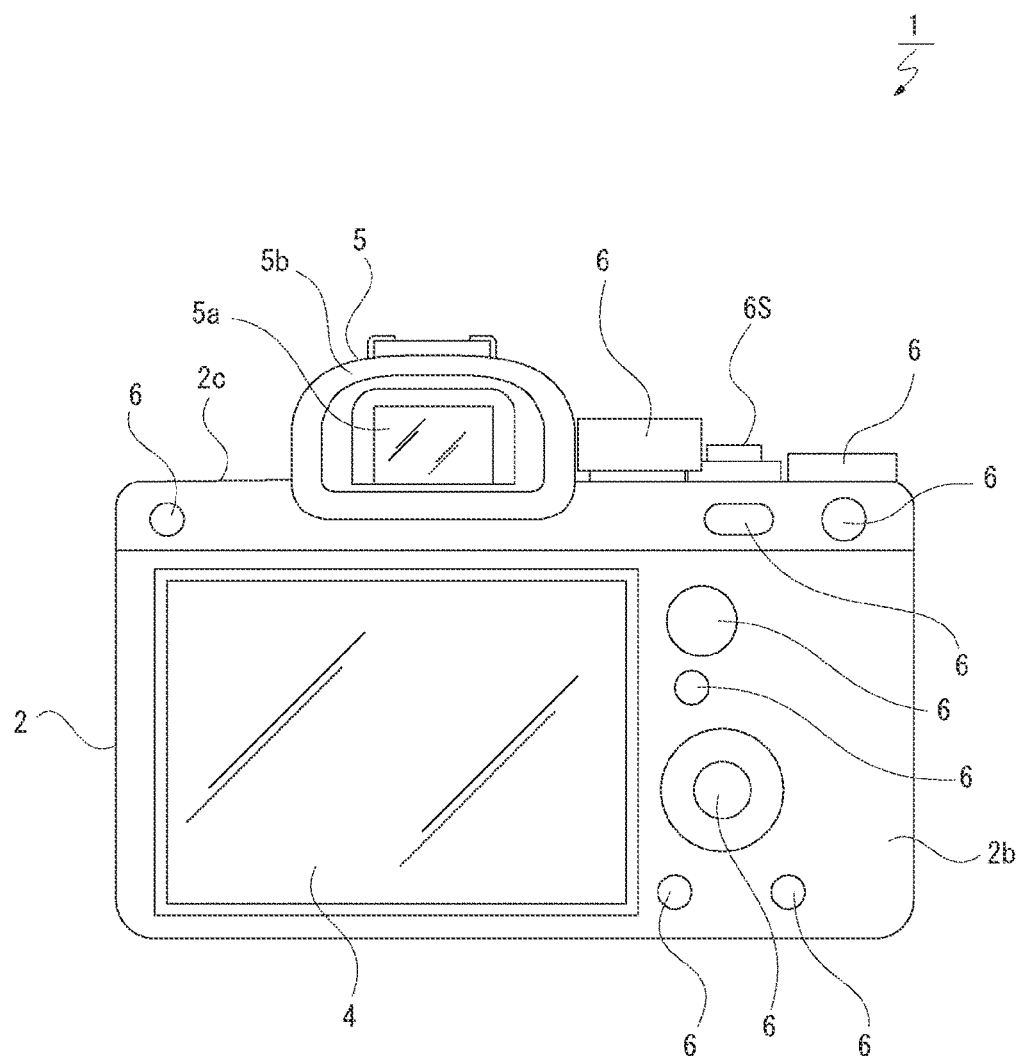
FIG. 2 is a rear view of the imaging apparatus according to the embodiment.

FIGS. 1 and 2 illustrate external appearance of an imaging apparatus 1 according to the embodiment.

It should be note that, in the following examples, it is assumed that a subject is positioned forward and that a photographer is positioned rearward. However, such directions are for convenience of explanation. The implementation of the present technology is not limited to such directions.

As depicted in FIGS. 1 and 2, the imaging apparatus 1 includes a camera housing 2 and a lens barrel 3. The camera housing 2 is structured in such a manner that various required sections are disposed inside or outside. The lens barrel 3, which is detachable from the camera housing 2, is mounted on a front part 2a. It should be noted that the lens barrel 3 detachable as an interchangeable lens is merely an example. Alternatively, the lens barrel 3 may be undetachable from the camera housing 2.

A rear monitor 4 is disposed on a rear part 2b of the camera housing 2. The rear monitor 4 displays, for example, a live view image and a reproduction of a recorded image.

It is assumed that the rear monitor 4 is, for example, a display device such as an LCD (Liquid Crystal Display) or an organic EL (Electro-Luminescence) display.

The rear monitor 4 is assumed to be pivotable with respect to the camera housing 2. For example, the rear monitor 4 is pivotable in such a manner that the lower end of the rear monitor 4 moves rearward with the upper end of the rear monitor 4 used as a pivot shaft. It should be noted that the right or left end of the rear monitor 4 may work as a pivot shaft. Further, the rear monitor 4 may be pivotable around a plurality of pivot shafts.

An EVF (Electric Viewfinder) 5 is disposed on an upper part 2c of the camera housing 2. The EVF 5 includes an EVF monitor 5a and a fence 5b. The fence 5b is shaped like a frame and projected rearward to enclose the upper, left, and right sides of the EVF monitor 5a.

The EVF monitor 5a is formed by using, for example, an LCD or an organic EL display. It should be noted that an OVF (Optical View Finder) may alternatively be disposed instead of the EVF monitor 5a.

Various operating elements 6 are disposed on the rear part 2b and on the upper part 2c. The various operating elements 6 are, for example, a reproduction menu activation button, a select button, a cross key, a cancel button, a zoom key, and a slide key.

For example, various types of buttons, dials, and depressible or rotatable complex operating elements may be used as the operating elements 6. The various types of operating elements 6 make it possible to perform a menu operation, a reproduction operation, a mode selection/switching operation, a focus operation, a zoom operation, and a parameter selection/setup operation regarding, for example, a shutter speed or an F-number.

A shutter button 6S (release button) for a release operation is provided as one of the operating elements 6. An AF operation is performed when the shutter button 6S is half-pressed.

Figure 3:
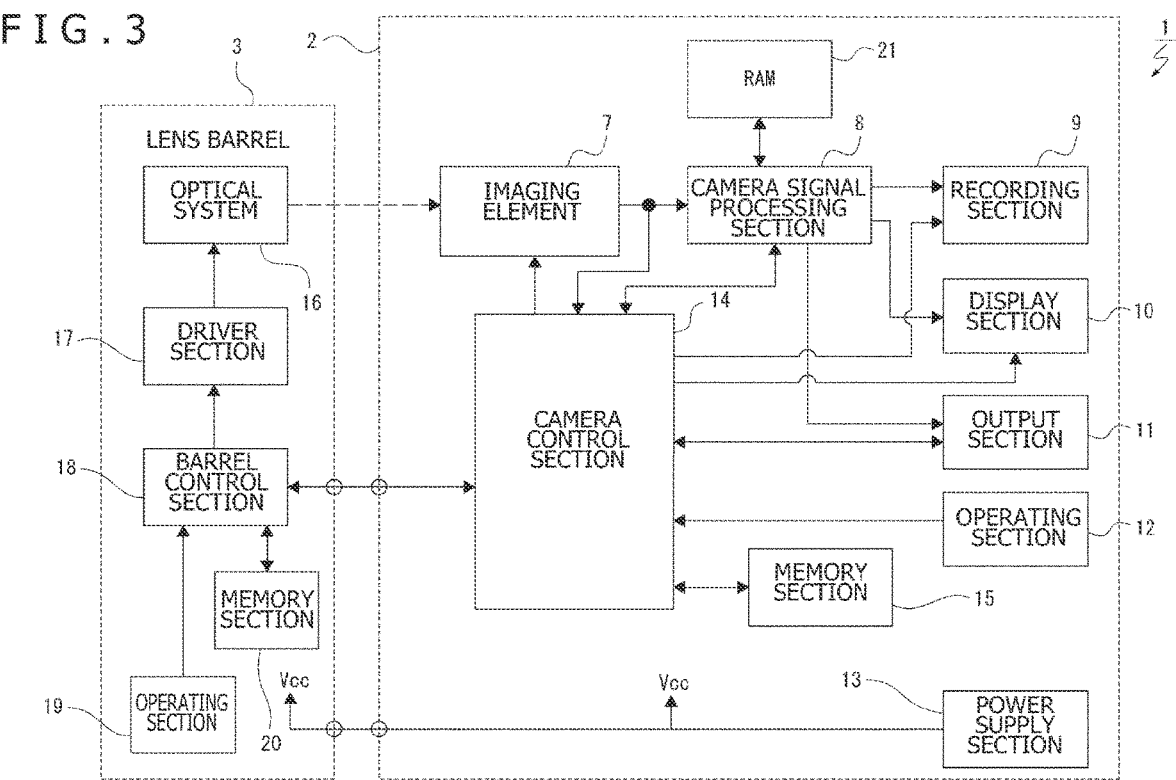
FIG. 3 is a block diagram illustrating a configuration of the imaging apparatus according to the embodiment.

FIG. 3 illustrates an internal configuration of the above-described imaging apparatus 1. For example, an imaging element 7, a camera signal processing section 8, a recording section 9, a display section 10, an output section 11, an operating section 12, a power supply section 13, a camera control section 14, a memory section 15, and a RAM 21 are disposed inside or outside of the camera housing 2 of the imaging apparatus 1.

The lens barrel 3 includes, for example, an optical system 16, a driver section 17, a barrel control section 18, an operating section 19, and a memory section 20.

The optical system 16 includes various lenses, such as an incident-end lens, a zoom lens, a focus lens, and a condenser lens, a lens for allowing a sensing operation to be performed in a state where a signal charge is within a dynamic range without being saturated, an aperture mechanism for providing exposure control by adjusting, for example, the amount of opening by an iris (aperture), and a shutter unit such as a focal plane shutter.

It should be noted that some parts of the optical system 16 may be disposed in the camera housing 2.

The imaging element 7 is, for example, of a CCD (Charge Coupled Device) type or a CMOS (Complementary Metal-Oxide Semiconductor) type, and used to provide exposure control of light of incident light emitted from the subject and incident through the optical system 16. Further, the imaging element 7 includes a processing section for performing, for example, a CDS (Correlated Double Sampling) process, an AGC (Automatic Gain Control) process, or an A/D (Analog/Digital) conversion process on an electrical signal that is photoelectrically converted by pixels. Therefore, the imaging element 7 outputs a captured image signal, which is digital data, to the camera signal processing section 8 and the camera control section 14.

The sensor surface of the imaging element 7 is provided with a sensing element that has a two-dimensional array of pixels.

Figure 4:
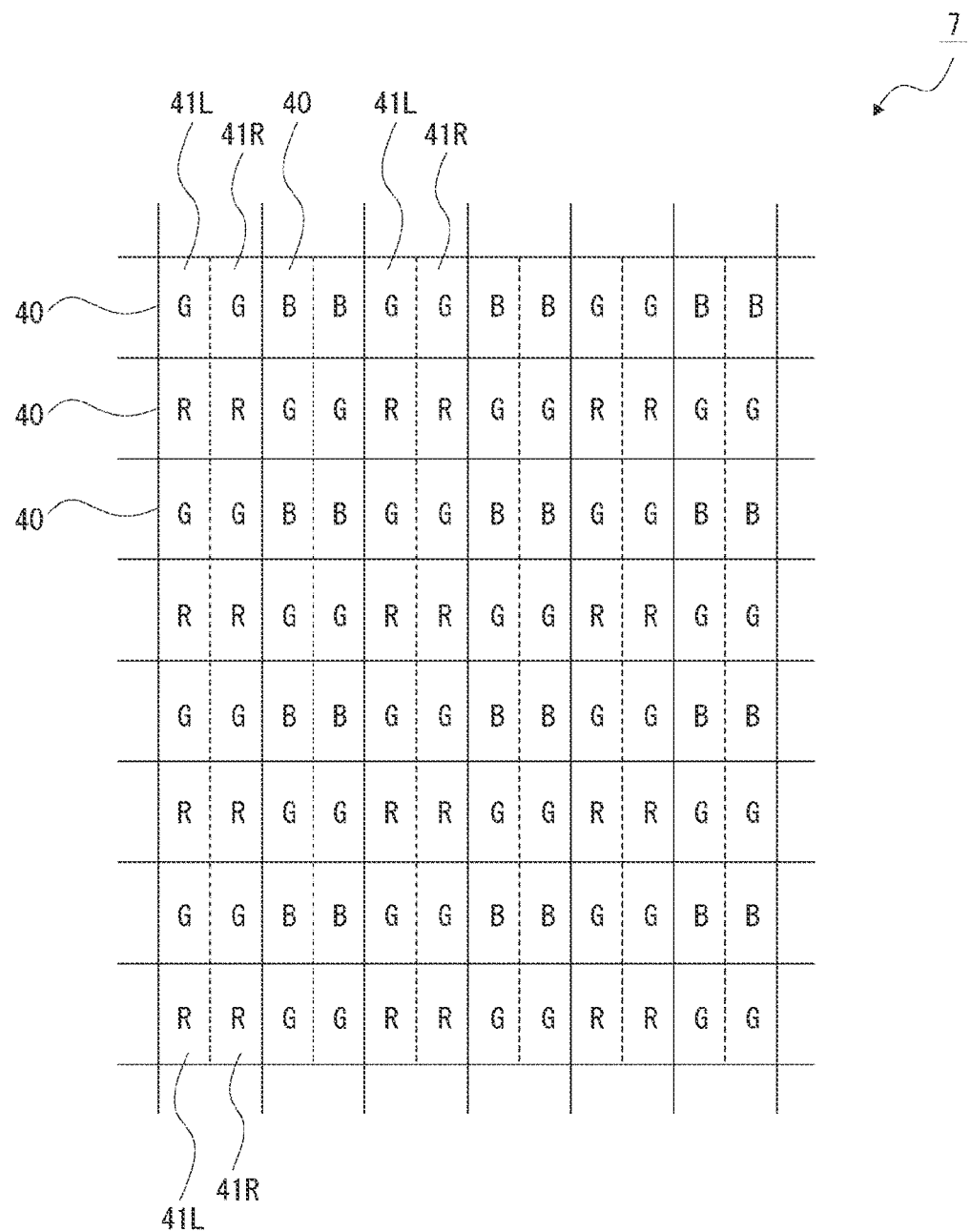
FIG. 4 is an explanatory diagram illustrating an imaging element having PD split pixels according to the embodiment.

As depicted in FIG. 4, the imaging element 7 is configured in such a manner that PD split pixels 40 are arranged in the row and column directions to form a matrix. Each of the PD split pixels 40 includes two PD pixels.

Figure 5:
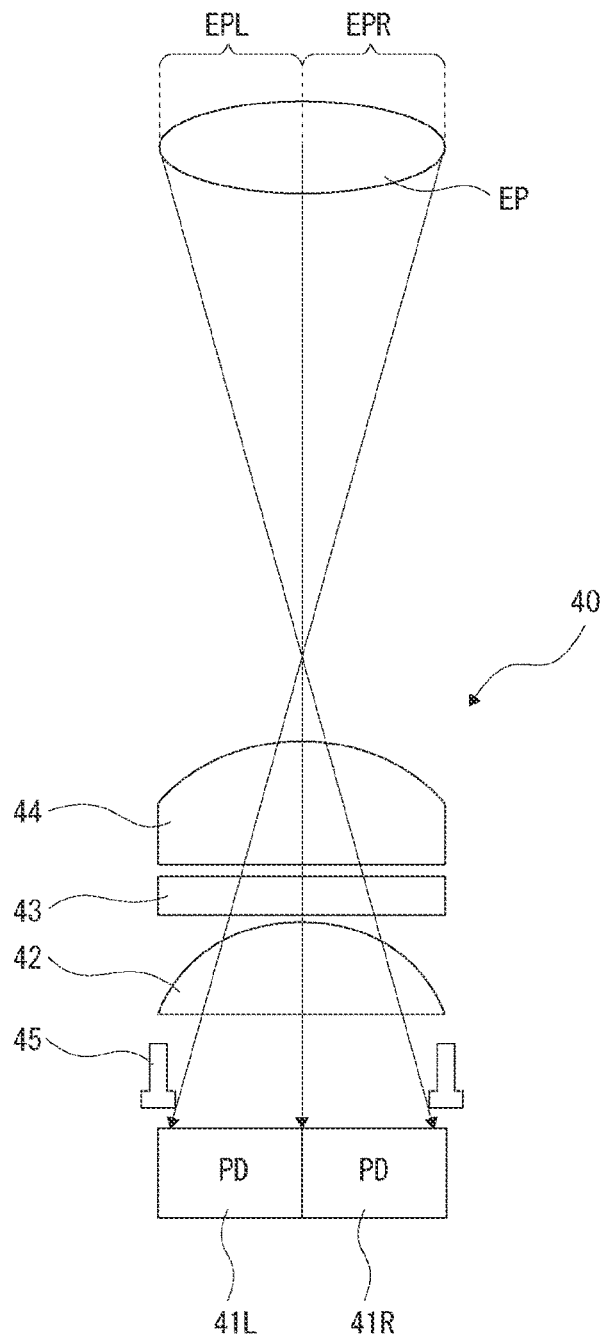
FIG. 5 is an explanatory diagram illustrating an example configuration of the PD split pixels disposed in an on-axis area.

FIG. 5 schematically illustrates a configuration of the PD split pixels 40.

Each of PD split pixels 40 includes two PD pixels, namely, a left PD pixel 41L and a right PD pixel 41R, pixel boundary metals 45, an inner lens 42, a color filter 43, and an on-chip microlens 44. The left PD pixel 41L is disposed on the left side, whereas the right PD pixel 41R is disposed on the right side. The pixel boundary metals 45 are respectively disposed forward of the left PD pixel 41L and the right PD pixel 41R. The color filter 43 is a color filter with spectral sensitivity to red (R), a color filter with spectral sensitivity to green (G), or a color filter with spectral sensitivity to blue (B). It should be noted that, in an alternative configuration, some of the above-mentioned parts, such as the inner lens 42, are not included in the PD split pixels 40.

As depicted in FIG. 5, the left PD pixel 41L receives light passing through a right pupil area EPR of an exit pupil EP, whereas the right PD pixel 41R receives light passing through a left pupil area EPL of the exit pupil EP. This implements a pupil division function.

The PD split pixels 40 described above are arrayed as R pixels, G pixels, and B pixels as depicted in FIG. 4 depending on the difference in the color filter 43.

For example, in the case of the G pixels acting as one of PD split pixels 40, a signal obtained as the sum of the values of the left PD pixel 41L and the right PD pixel 41R becomes one G pixel signal. Further, phase difference detection can be made depending on the values of the left PD pixel 41L and the right PD pixel 41R.

Returning now to FIG. 3, the camera signal processing section 8 includes, for example, a microprocessor dedicated to digital signal processing, such as a DSP (Digital Signal Processor), or a microcomputer.

The camera signal processing section 8 performs various signal processing on a digital signal (captured image signal) transmitted from the imaging element 7.

More specifically, the camera signal processing section 8 performs processing such as processes for inter-channel correction of R, G, and B colors, white balance correction, aberration correction, and shading correction.

Further, the camera signal processing section 8 performs various processes such as a YC generation process of generating (separating) a brightness (Y) signal and a color (C) signal from R, G, and B image data, a process of adjusting brightness and color, and a process of making a knee correction and a gamma correction.

Furthermore, the camera signal processing section 8 performs, for example, a resolution conversion process and a codec process of encoding for recording or communication in order to convert the image data into a final output format. The memory section 15 stores the image data that is converted into the final output format. Moreover, the image data is outputted to the display section 10 in order to display an image on the rear monitor 4 and the EVF monitor 5a. Additionally, when the image data is outputted from an external output terminal, the image is displayed on a monitor or other equipment disposed outside the imaging apparatus 1.

The camera signal processing section 8 also performs a phase difference detection process. The phase difference detection process is a process of detecting a phase difference from the output values of the left PD pixel 41L and the right PD pixel 41R of each of the PD split pixels 40. Further, the camera signal processing section 8 calculates a defocus amount based on information regarding the detected phase difference. The calculated defocus amount is used for AF control in the camera control section 14. That is, the camera control section 14 performs the AF operation by providing drive control of the focus lens in the optical system 16 through the barrel control section 18 according to the defocus amount.

It should be noted that the calculated defocus amount may be used to present a user with information regarding the focus condition of the subject.

The RAM 21 is depicted as a memory for temporarily storing, for example, the output values of the left PD pixel 41L and the right PD pixel 41R during the phase difference detection process.

The recording section 9 includes, for example, a non-volatile memory, and stores an image file (content file), for instance, of still image data or video data, attribute information regarding the image file, and a thumbnail image.

The image file is stored in a format such as a JPEG (Joint Photographic Experts Group) format, a TIFF (Tagged Image File Format), or a GIF (Graphics Interchange Format).

In actual implementation, the recording section 9 may be in various forms. For example, the recording section 9 may be configured as a flash memory built in the imaging apparatus 1 or may include a memory card (e.g., portable flash memory) detachable from the imaging apparatus 1 and an access section for accessing the memory card for storage and read-out purposes. Further, the recording section 9 may be implemented, for example, as an HDD (Hard Disk Drive) built in the imaging apparatus 1.

The display section 10 performs a process of presenting various displays to the photographer. It is assumed that the display section 10 is, for example, the rear monitor 4 or the EVF monitor 5a. The display section 10 performs a process of displaying image data that is inputted from the camera signal processing section 8 and converted into an appropriate resolution. This results in displaying a generally-called through-image that is an image captured in a release standby state.

Further, in accordance with an instruction from the camera control section 14, the display section 10 implements an on-screen GUI (Graphical User Interface) display function of displaying, for example, various operation menus, icons, and messages.

Furthermore, the display section 10 is able to display a reproduction of image data that is read out from a recording medium in the recording section 9.

The output section 11 establishes data communication with external equipment and network communication in a wired or wireless manner. For example, the output section 11 transmits captured image data (still image files and video files) to external equipment such as a display apparatus, a recording apparatus, and a reproduction apparatus.

Further, the output section 11 may function as a network communication section. For example, the output section 11 may establish communication by using various networks such as the Internet, a home network, and a LAN (Local Area Network), and transmit and receive various types of data to and from, for example, a networked server or terminal.

The operating section 12 disposed on the camera housing 2 includes, for example, the rear monitor 4, which is of a touch panel type, in addition to the above-mentioned various operating elements 6, and outputs, to the camera control section 14, operating information regarding, for example, tap and swipe operations performed by the photographer.

It should be noted that the operating section 12 may function as a reception section of external operating equipment such as a remote controller separate from the imaging apparatus 1.

The power supply section 13 generates a supply voltage (Vcc) required for each section from a battery that is built in, and supplies the generated supply voltage as an operating voltage.

In a state where the lens barrel 3 is attached to the imaging apparatus 1, the supply voltage Vcc generated by the power supply section 13 is additionally supplied to a circuit in the lens barrel 3.

It should be noted that a circuit for charging the battery and a circuit for generating the supply voltage Vcc may be formed in the power supply section 13 on the presumption that these circuits operate on a DC voltage that is obtained by conversion and inputted by an AC adaptor connected to a commercial power source.

The camera control section 14 includes a microcomputer (arithmetic processing unit) having a CPU (Central Processing Unit) and provides comprehensive control of the imaging apparatus 1. For example, the camera control section 14 controls the shutter speed in response to a photographer's operation, issues instructions regarding various signal processing operations in the camera signal processing section 8, and provides control, for example, of imaging operations, recording operations, and reproduction operations on recorded image files.

Further, the camera control section 14 issues instructions to the barrel control section 18 in order to control various lenses included in the optical system 16. For example, the camera control section 14 issues instructions for the purpose of providing zoom control and AF control. Furthermore, the camera control section 14 performs a process of specifying the aperture value for providing a light intensity required for AF control, and issues instructions for specifying the operation of the aperture mechanism according to the aperture value.

It is assumed that the camera control section 14 is able to acquire, through the barrel control section 18, lens information regarding the various lenses included in the optical system 16. The lens information includes, for example, information regarding the model number of a lens, the position of the zoom lens, and the F-number or information regarding the position of the exit pupil. Further, it is assumed that the camera control section 14 is able to acquire the aperture value of the aperture mechanism included in the optical system 16.

The memory section 15 stores, for example, information used for a process performed by the camera control section 14. For example, a ROM (Read Only Memory), a RAM (Random Access Memory), and a flash memory are collectively depicted as the memory section 15.

It should be noted that the memory section 15 and the above-mentioned RAM 21 may be a memory area built in a microcomputer chip acting as the camera control section 14 or may be formed by a separate memory chip.

For example, the ROM and the flash memory in the memory section 15 store, for instance, a program used by the camera control section 14. For example, the ROM and the flash memory store, for instance, application programs and firmware for various operations in addition to an OS (Operating System) for allowing the CPU to control various sections and content files such as image files.

The camera control section 14 exercises overall control over the imaging apparatus 1 and the lens barrel 3 by executing the relevant application programs.

The RAM in the memory section 15 temporarily stores, for example, data and programs used for various types of data processing operations performed by the CPU in the camera control section 14, and is thus used as a work area for the camera control section 14.

The barrel control section 18 of the lens barrel 3 includes, for example, a microcomputer, and outputs a control signal to the driver section 17 in order to actually drive the various lenses in the optical system 16 in accordance with instructions from the camera control section 14.

It should be noted that information communication between the camera control section 14 and the barrel control section 18 may be enabled only in a state where the lens barrel 3 is attached to the camera housing 2 or enabled in a wireless manner in a state where the lens barrel 3 is not attached to the camera housing 2.

According to the types and driving positions of the various lenses included in the optical system 16, the barrel control section 18 transmits information regarding an exit pupil position and a pupil distance of the exit pupil to the camera control section 14.

More specifically, the barrel control section 18 acquires information regarding the pupil distance from information recorded in a ROM as the memory section 20.

The driver section 17 includes, for example, a motor driver for a zoom lens drive motor, a motor driver for a focus lens drive motor, and an aperture mechanism driver for a motor driving the aperture mechanism.

Each of the above drivers supplies a drive current to the associated drive motor in accordance with an instruction from the barrel control section 18.

The operating section 19 of the lens barrel 3 denotes an operating element disposed toward the lens barrel 3. The operating information generated by the operating section 19 is supplied to the barrel control section 18, and then reported to the camera control section 14 through the barrel control section 18.

In response to the operation of the operating section 19, the barrel control section 18 provides motion control of the optical system 16, and the camera control section 14 performs various setup operations and provides motion control.

The operating section 19 may function as a reception section of external operating equipment such as a remote controller separate from the lens barrel 3.

The memory section 20 includes, for example, a ROM and a flash memory, and stores, for instance, programs and data used by the barrel control section 18. The memory section 20 stores, for example, the OS (Operating System) for allowing the CPU to control various sections, and additionally stores application programs and firmware for various operations.

Further, the information to be stored in the memory section 20 includes information regarding, for example, the pupil distance of the exit pupil of the optical system 16.

Figure 6:
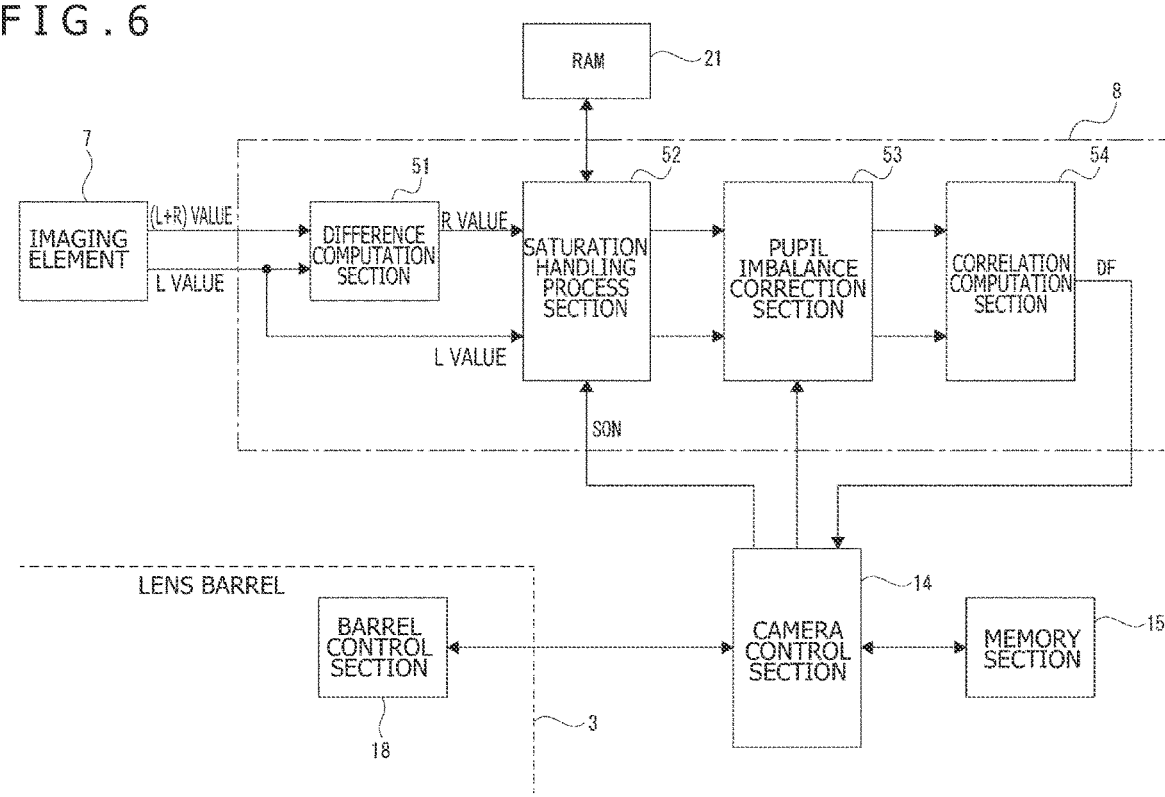
FIG. 6 is a block diagram illustrating an internal configuration of a camera signal processing section of the imaging apparatus according to the embodiment.

FIG. 6 illustrates a configuration for the phase difference detection process in the camera signal processing section 8 and a configuration for AF control based on the configuration for the phase difference detection process.

As depicted in FIG. 6, the camera signal processing section 8 includes, as components for the phase difference detection process, a difference computation section 51, a saturation handling process section 52, a pupil imbalance correction section 53, and a correlation computation section 54.

The output value of the PD split pixel 40 is supplied from the imaging element 7 to the difference computation section 51.

As depicted in FIG. 4 described above, in the case of the imaging element 7 in which the PD split pixels 40 each including the left PD pixel 41L and the right PD pixel 41R are arrayed, each of the PD split pixels 40 is able to not only read out a normal pixel signal for image generation but also separately acquire the left and right PD output values. The defocus amount for AF control can be calculated from the left and right PD output values.

Accordingly, for example, an (L+R) value and an L value are read out from one PD split pixel 40.

It should be noted that the "(L+R) value" is an output value obtained by adding electric charges from the left PD pixel 41L and the right PD pixel 41R, and that the "L value" is an output value obtained by reading out an electric charge from the left PD pixel 41L.

The (L+R) value, that is, the value obtained by adding the electric charges from the left PD pixel 41L and the right PD pixel 41R represents the pixel value of the relevant PD split pixel 40 and is thus used as a signal for image generation.

Further, L read-out is performed to acquire the output value (L value) of the left PD pixel 41L, and the L value is subtracted from the (L+R) value to obtain the output value (R value) of the right PD pixel 41R. The phase difference between pixel components to which pupil division is applied can be obtained by using the "L value" and the "R value."

The difference computation section 51 depicted in FIG. 6 acquires the output value (R value) of the right PD pixel 41R by performing the above-described computation of (L+R) value −L value.

The L value is supplied not only to the difference computation section 51 but also to the saturation handling process section 52.

It should be noted that the embodiment will be described with reference to an example where the (L+R) value and the L value are to be read out. However, the L value and the R value can also be acquired in a similar manner by reading out the (L+R) value and the R value.

In a case where an overflow occurs in the left PD pixel 41L or the right PD pixel 41R, the saturation handling process section 52 performs a process of correcting the L value and the R value to the original ones according to the overflow. It can be said that this process is performed to restore the output values that are obtained in a case where the output range of the L value and the R value is assumed to become wider in a direction in which the level of overflow becomes higher.

Accordingly, while temporarily storing the L and R values in the RAM 21, the saturation handling process section 52 performs a necessary calculation process to obtain corrected L and R values.

However, a control signal SON from the camera control section 14 specifies whether or not the saturation handling process section 52 should perform a saturation handling process. In a case where the control signal SON issues an instruction for performing the saturation handling process, the saturation handling process section 52 performs the saturation handling process. When the instruction for performing the saturation handling process is not issued by the control signal SON, the saturation handling process section 52 transfers inputted L and R values directly to the pupil imbalance correction section 53.

The pupil imbalance correction section 53 makes a correction (left-right PD pixel pupil imbalance correction) on the L and R values so as to flatten output value fluctuations due to an image height irrespective of the image height and match the output levels of the L and R values.

Information regarding lens vignetting and light receiving angle characteristics of the left PD pixel 41L and the right PD pixel 41R, which are stored in the memory section 15, are used for the above-mentioned left-right PD pixel pupil imbalance correction.

The saturation handling process and the left-right PD pixel pupil imbalance correction will be described in detail later.

The correlation computation section 54 performs correlation computation on the L and R values inputted from the pupil imbalance correction section 53, namely, signals having a phase difference. Phase difference detection by correlation computation is described below.

Figure 7:
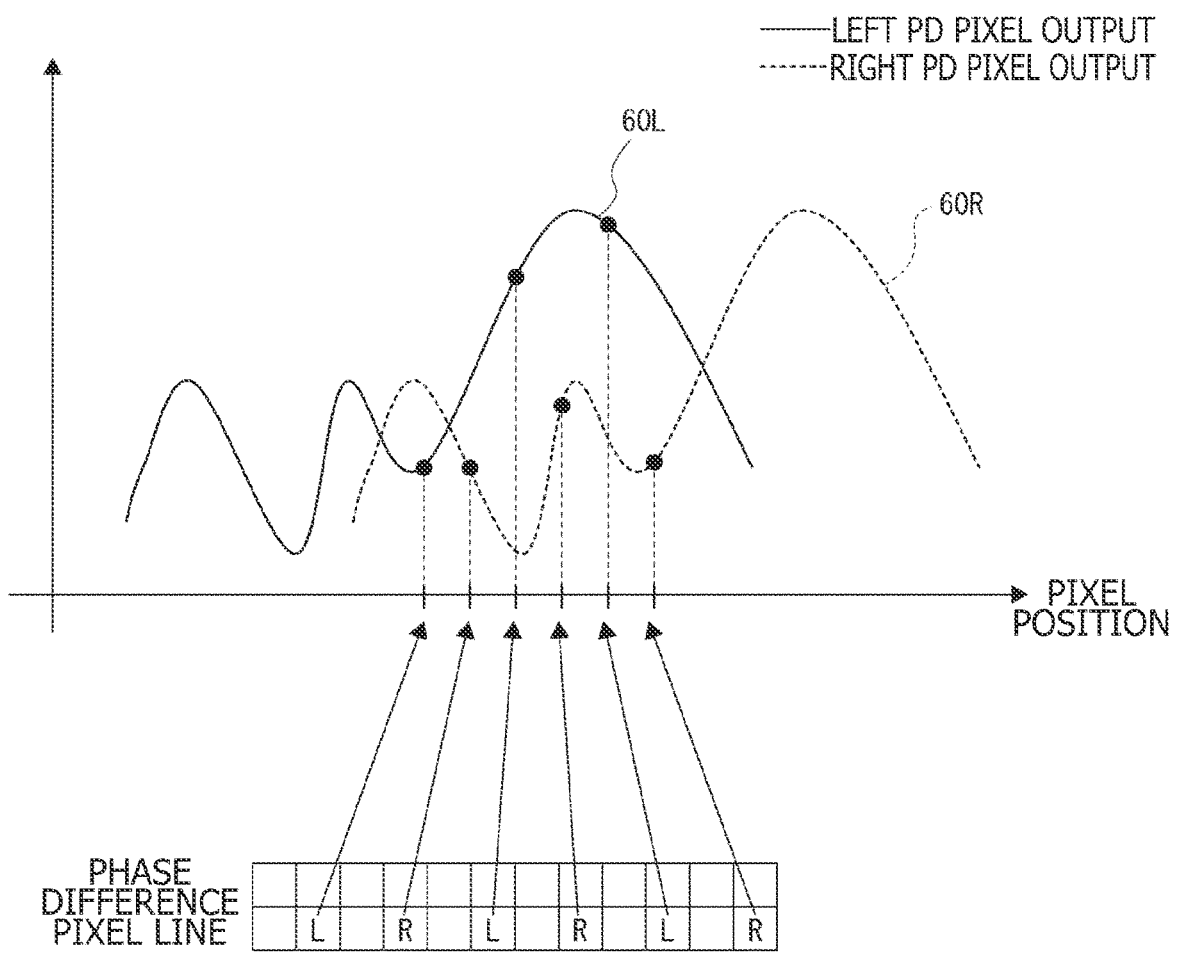
FIG. 7 is an explanatory diagram illustrating phase difference detection by correlation computation.

FIG. 7 depicts output waveforms that are obtained by arranging the output values of the PD split pixels 40 on the imaging element 7. A signal waveform (left PD pixel output 60L) derived from the L value outputted from the left PD pixel 41L is indicated by a solid line, and a signal waveform (right PD pixel output 60R) derived from the R value outputted from the right PD pixel 41R is indicated by a dashed line.

Figure 8A:
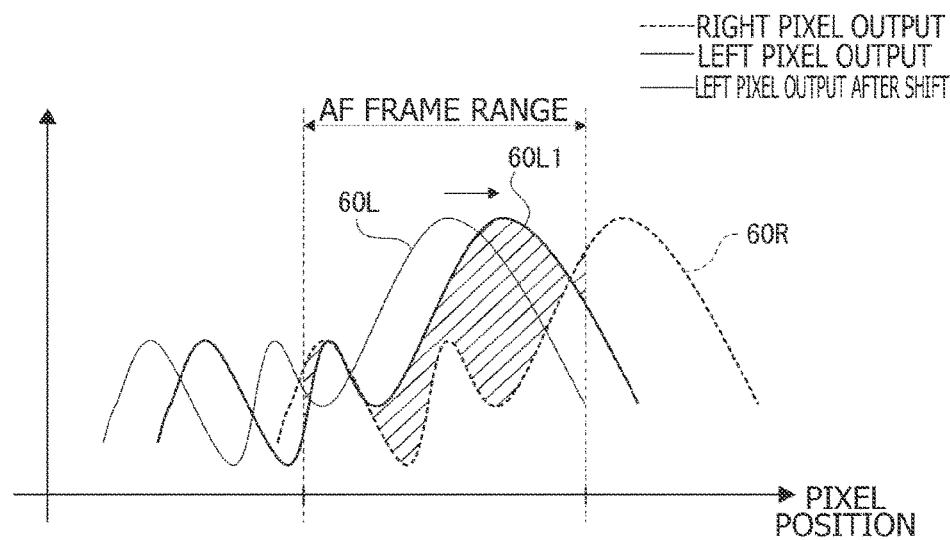
FIGS. 8A, 8B, and 8C illustrate explanatory diagrams of phase difference detection by correlation computation.

Now, depicted in FIG. 8A is a waveform 60L1 that is obtained by shifting the waveform of a left PD pixel output 60L rightward for a predetermined distance in a graph.

Figure 8B:
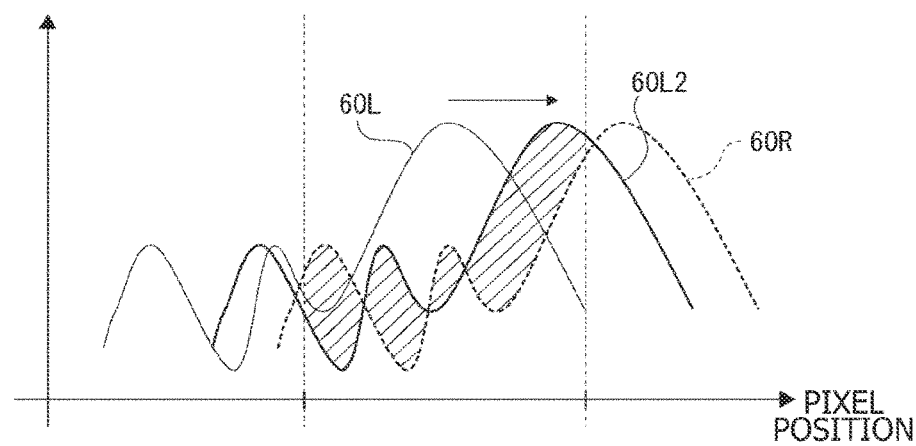

Further, depicted in FIG. 8B is a waveform 60L2 that is obtained by shifting the waveform 60L1 further rightward for a predetermined distance.

Figure 8C:
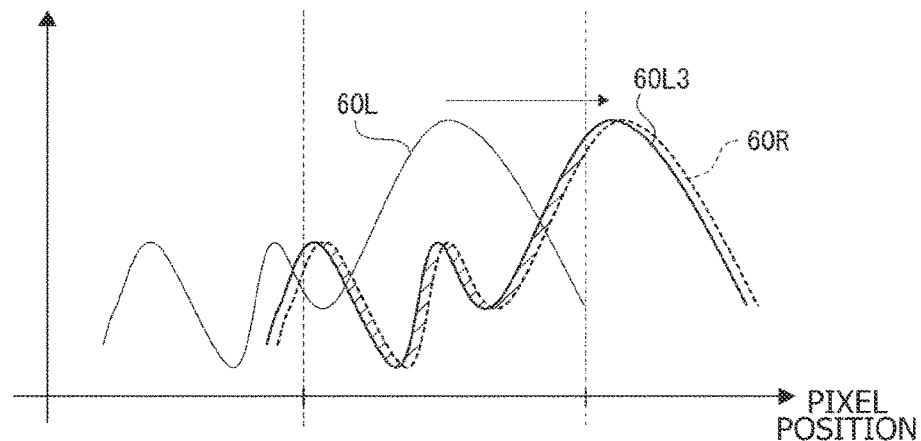

Furthermore, depicted in FIG. 8C is a waveform 60L3 that is obtained by shifting the waveform 60L2 further rightward for a predetermined distance.

Shaded areas in FIGS. 8A, 8B, and 8C indicate the absolute value of a difference integral value of the waveforms of the left PD pixel output 60L and the right PD pixel output 60R.

Figure 9:
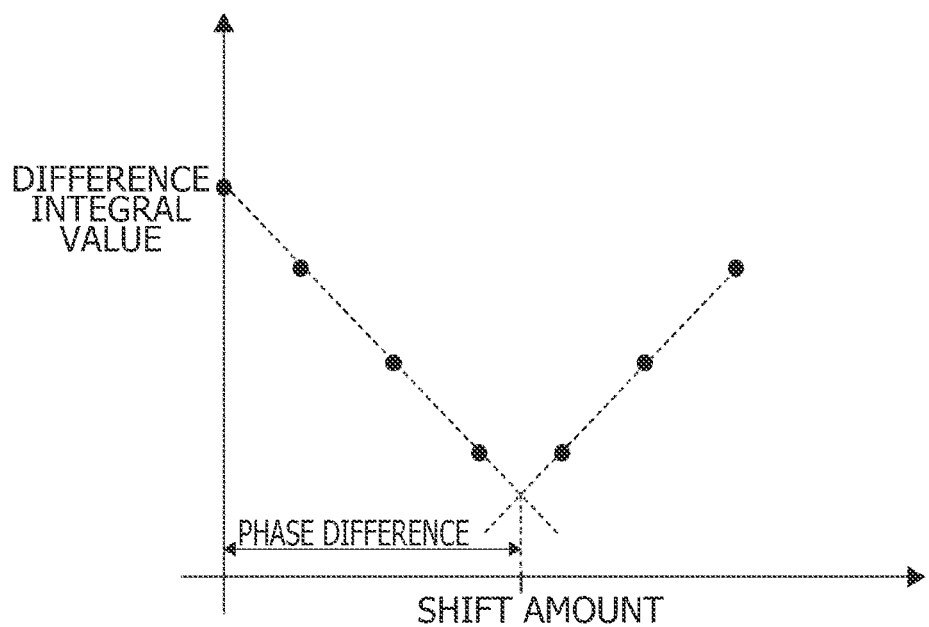
FIG. 9 is an explanatory diagram illustrating a relation between difference integral value and shift amount.

FIG. 9 depicts a graph of the difference integral value that is indicated by FIG. 7 and by the shaded areas in FIGS. 8A, 8B, and 8C.

As depicted in FIG. 9, the difference integral value decreases with an increase in a shift amount, and when a predetermined shift amount is exceeded, the difference integral value increases again with an increase in the shift amount.

The shift amount minimizing the difference integral value is a phase difference amount.

That is, appropriate AF control can be provided by moving the focus lens in such a manner as to shift the outputs of the left PD pixel 41L and the right PD pixel 41R by the phase difference and make the waveforms of the left PD pixel output 60L and the right PD pixel output 60R substantially overlap with each other.

It should be noted that generally-called front focus and rear focus can be differentiated from each other by the direction of shifting the left PD pixel output 60L. More specifically, in a state depicted in FIG. 9, the difference integral value can be minimized by rightward shifting the waveform of the left PD pixel output 60L. This state is referred to as a generally-called front focus state.

Meanwhile, a state where the difference integral value can be minimized by leftward shifting the waveform of the left PD pixel output 60L is referred to as a generally-called rear focus state.

Figure 10:
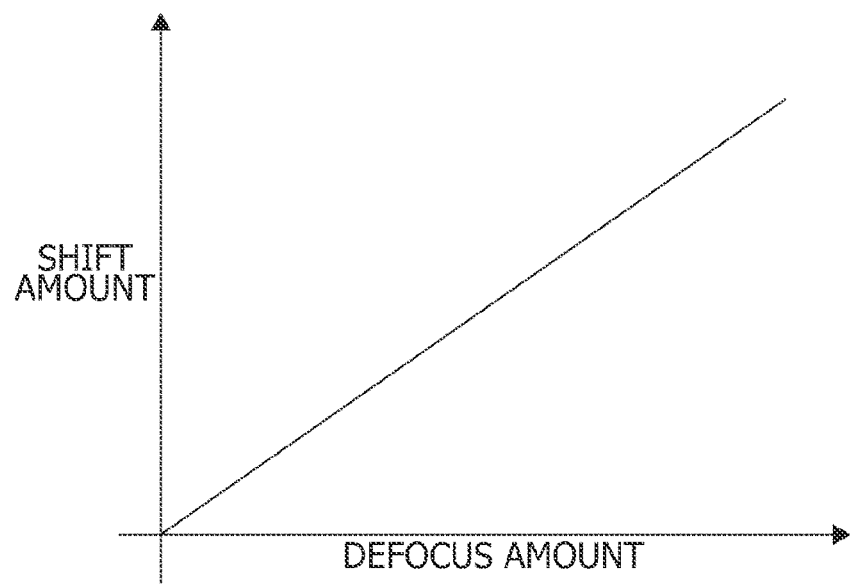
FIG. 10 is an explanatory diagram illustrating a relation between shift amount and defocus amount.

FIG. 10 illustrates a relation between shift amount and defocus amount. The shift amount presents the amount of shift that minimizes the difference integral value depicted in FIG. 7 and may be referred to also as the phase difference. In a case where the defocus amount is close to zero, a relation between shift amount and defocus amount can be generally expressed by a linear function. The defocus amount increases with an increase in the shift amount, and a state where the shift amount is large is, namely, an out-of-focus state. The defocus amount DF can be calculated from the shift amount.

The correlation computation section 54 determines the defocus amount DF, and outputs the determined defocus amount to the camera control section 14. The camera control section 14 is able to provide AF control by using the defocus amount DF.

2. OVERFLOW AND SATURATION HANDLING PROCESS

An overflow occurring in the PD split pixels 40 and the saturation handling process on the overflow will now be described.

Figure 11:
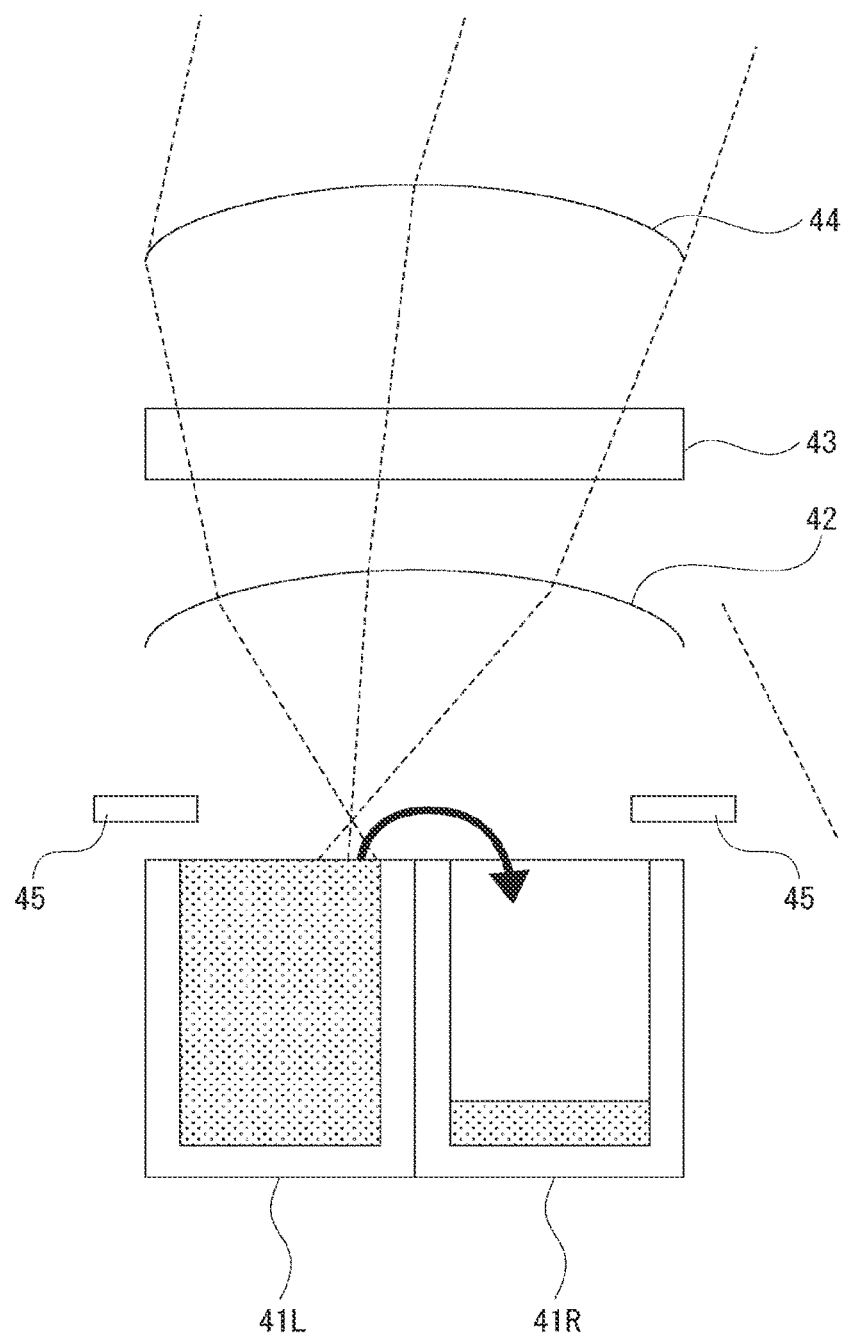
FIG. 11 is an explanatory diagram illustrating a relation between one-side PD overflow and signal mixing in the PD split pixels.

First of all, FIG. 11 schematically depicts an overflow occurring in a PD on one side. In a case where incident light has medium to high brightness, an overflow may occur in one of the PD split pixels 40 to make the output value reach a saturation value.

Incident light obliquely falls on the PD split pixel 40, for example, in the periphery of the imaging element 7. The example depicted in FIG. 11 indicates a state where the incident light is likely to fall on the left PD pixel 41L. Therefore, an overflow is likely to occur in the left PD pixel 41L.

It is said that, in this case, the (L+R) value is also used as a pixel signal for image generation. That is, one pixel included in an image is formed by a pair of left PD pixel 41L and right PD pixel 41R.

Therefore, when an overflow occurs in one of the PD pixels, it is undesirable that a resulting excess electric charge be discarded. The reason is that the accuracy of a pixel brightness value degrades.

Accordingly, in a case where an overflow occurs in one of the PD pixels, a pixel circuit configuration adopted in the PD split pixels 40 allows the resulting excess electric charge to leak into the other one of the PD pixels. FIG. 11 depicts how the resulting excess electric charge leaks from the left PD pixel 41L into the right PD pixel 41R.

That is, the PD split pixel 40 is configured such that the resulting excess electric charge leaks into the right PD pixel 41R in a case where an overflow occurs in the left PD pixel 41L, and leaks into the left PD pixel 41L in a case where an overflow occurs in the right PD pixel 41R. This ensures that the output value ((L+R) value) obtained by the entirety of the PD split pixel 40 is based on the intensity of received light.

As a result, the accuracy of the pixel signal forming an image is adequately maintained. However, an inconvenience occurs in phase difference detection, which aims, for example, at the above-mentioned AF control.

For example, in a case where leakage occurs as depicted in FIG. 11, the L value is clipped to a saturation value and is thus smaller than an original output value, whereas the R value is greater than an original output value due to leakage. This reduces the accuracy of detection of the defocus amount DF that is based on the difference integral value of the waveforms of the left value and the R value. That is, AF accuracy decreases.

Figure 12A:
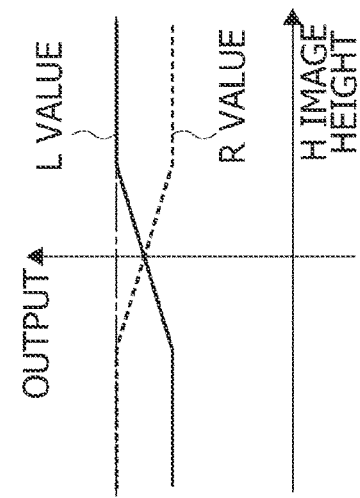
FIGS. 12A, 12B, 12C, and 12D illustrate explanatory diagrams of waveforms obtained after pupil imbalance correction in the event of an overflow.

For example, FIG. 12A depicts the L value and the R value by indicating an H image height (image height in the horizontal direction) along the horizontal axis and indicating the output values along the vertical axis. In this case, it is conceivable that the horizontal axis represents the horizontal direction of the imaging element 7. For example, the output values are based on pixel positions in a case where light from an entirely white subject is incident on all pixels of the imaging element 7.

The one-dot chain line indicates an overflow level. Further, the solid line and the dashed line respectively indicate the output value (L value) of the left PD pixel 41L and the output value (R value) of the right PD pixel 41R in a situation where no overflow is taken into consideration.

Figure 12B:
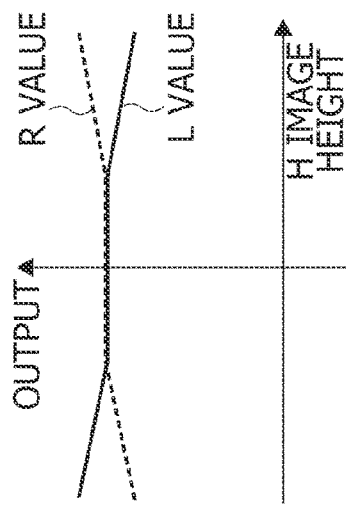

When an overflow and leakage are taken into consideration as described above, the actual L value and R value are as depicted in FIG. 12B. More specifically, the output value of pixel exceeding the overflow level is clipped, whereas the output value of the other PD pixel increases due to leakage.

This decreases the accuracy of detection of the phase difference between the L value and the R value and thus decreases the accuracy of detection of the defocus amount DF.

Additionally, the overflow and the left-right PD pixel pupil imbalance correction are described below.

Figure 12C:
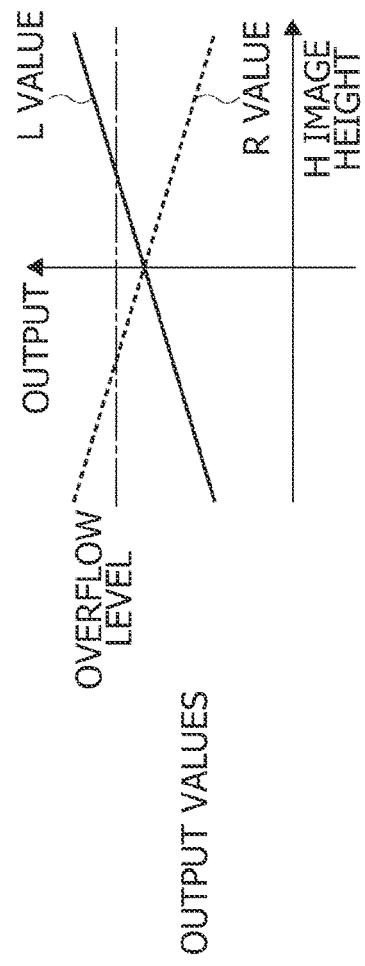

The left-right PD pixel pupil imbalance correction is a process of correcting a level difference caused by an incident light angle based on the H image height. More specifically, the left-right PD pixel pupil imbalance correction is a process of flattening the horizontal direction level characteristics of the L and R values as depicted in FIG. 12C by using a correction factor based on horizontal direction pixel addresses (the horizontal line direction coordinate values of pixels of the imaging element 7). This process removes the level difference based on the pixel positions of the L and R values, and thus increases the AF accuracy.

However, the above description deals with a case where the left-right PD pixel pupil imbalance correction is made on the L and R values in an ideal state without an overflow that is depicted in FIG. 12A.

Figure 12D:
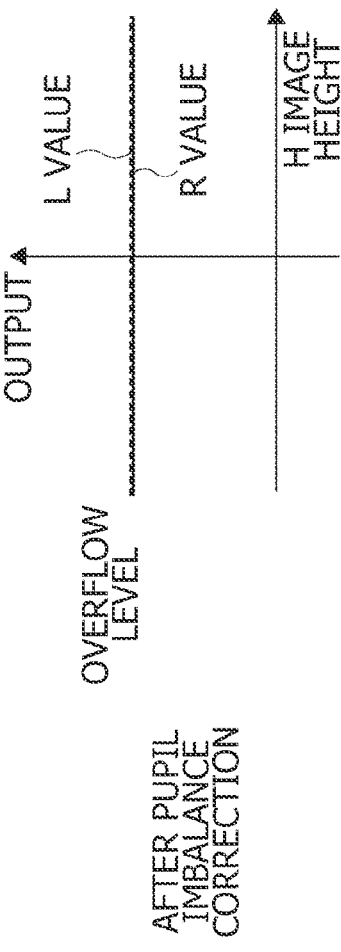

Meanwhile, when the overflow and the leakage are taken into consideration, the actual L and R values are as depicted in FIG. 12B. However, when the left-right PD pixel pupil imbalance correction is made in such a situation, overflowed pixels are excessively corrected, so that the corrected L and R values are as depicted in FIG. 12D. Such an excessive correction breaks the waveforms, which conversely decreases the AF accuracy.

In view of the above circumstances, the present embodiment is configured such that the saturation handling process is performed to restore the original values of the L and R values.

Figure 13:
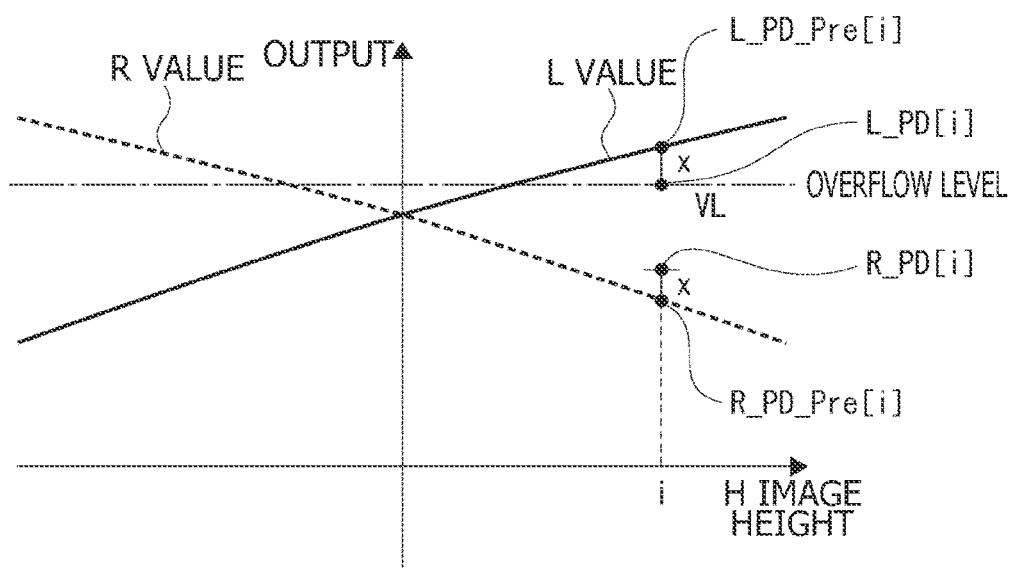
FIG. 13 is an explanatory diagram illustrating the concept of a saturation handling process according to the embodiment.

FIG. 13 depicts the L value and the R value by indicating the H image height along the horizontal axis and indicating the output values along the vertical axis, as is the case with FIG. 12A. The one-dot chain line indicates the overflow level. Further, the solid line and the dashed line respectively indicate the output value (L value) of the left PD pixel 41L and the output value (R value) of the right PD pixel 41R in a situation where no overflow is taken into consideration.

The actual output values are clipped to the overflow level. Therefore, when the actual L and R values of the PD split pixels 40 at a horizontal pixel address [i] are considered, the L value (L_PD[i]) is at the overflow level. Further, the R value (R_PD[i]) is at a level that is higher than the actual level by the amount of leakage x due to the influence of the leakage of the overflow. It should be noted that it can be said that the amount of leakage x is the amount of electric charge that is reduced by the overflow toward the left PD pixel 41L.

The L and R values respectively indicated by the solid line and the dashed line in FIG. 13 are ideal values in a case where it is assumed that no overflow occurs. Therefore, the values of a portion exceeding the overflow level are not actually obtained.

Accordingly, the acquisition of such ideal values is made possible to obtain predicted output values (L_PD_Pre[i], R_PD_Pre[i]) of the L and R values. That is, the predicted output values are the values of individual PD pixels at the pixel address [i].

When the above-described predicted output values are obtained, the predicted output values and actual output values can be used to obtain the original output values, namely, the L and R values that are obtained when no overflow occurs.

The predicted output values can be obtained on the basis of the information regarding the light receiving angle characteristics of the PD pixels and the lens vignetting.

First of all, the light receiving angle characteristics of the right PD pixel 41R and the left PD pixel 41L will be described.

Depicted in FIG. 14A are the light receiving angle characteristics of the right PD pixel 41R and the left PD pixel 41L. FIG. 14A indicates the distribution of light sensitivity along the pan axis (pan angle) and the tilt axis (tilt angle) by using contour lines. The light sensitivity increases with a decrease in the distance to the center of the contour area.

Depicted in FIG. 14B are the light receiving angle characteristics of the right PD pixel 41R and the left PD pixel 41L. The light receiving angle characteristics are depicted by using a cross section with a tilt axis of 0° while the horizontal axis represents the pan axis and the vertical axis represents the light sensitivity.

Depicted in FIG. 14C are light reception images of the right PD pixel 41R and the left PD pixel 41L.

As is obvious from FIGS. 14A, 14B, and 14C, the right PD pixel 41R is highly sensitive to rays coming from the right, and the left PD pixel 41L is highly sensitive to rays coming from the left.

In order to predict the outputs of the right PD pixel 41R and left PD pixel 41L, which have the above-described sensitivity characteristics, it is necessary to consider lens vignetting (angular range of light propagation).

Depicted in FIG. 15A is lens vignetting 90 of a PD split pixel 40 at the center of an H direction (horizontal direction) and at the center of a V direction (vertical direction) in the imaging element 7. The lens vignetting 90 is depicted on contour lines indicative of the light receiving angle characteristics. The horizontal axis represents a pan axis angle, and the vertical axis represents a tilt angle.

The integral values of light sensitivity within the lens vignetting 90 are the output values of the PD pixels. In the case of these pixels, the output value (R value) of the right PD pixel 41R and the output value (L value) of the left PD pixel 41L are equivalent to each other.

Depicted in FIG. 15B is lens vignetting 90 of a PD split pixel 40 at the H direction positive end and at the center of V direction in the imaging element 7. The lens vignetting 90 is depicted on contour lines indicative of the light receiving angle characteristics.

The integral values of light sensitivity within the lens vignetting 90 indicate that the R value>the L value.

Depicted in FIG. 15C is lens vignetting 90 of a PD split pixel 40 at the H direction positive end and at the V direction positive end in the imaging element 7. The lens vignetting 90 is depicted on contour lines indicative of the light receiving angle characteristics.

The integral values of light sensitivity within the lens vignetting 90 indicate that the R value>the L value.

Stated differently, when the information regarding the lens vignetting 90 and light receiving angle characteristics, for example, of all pixel positions of the imaging element 7 is obtained, the predicted output values can be determined by using the integral values of light sensitivity within the lens vignetting 90.

For example, the light receiving angle characteristics are the characteristics of the installed imaging element 7, and thus can be stored, for example, in the memory section 15. Consequently, the camera control section 14 is able to supply the information regarding the light receiving angle characteristics to the saturation handling process section 52.

The information regarding the lens vignetting 90 is dependent on the lens barrel 3, the F-number, and the like. Therefore, the camera control section 14 is able to acquire the information regarding the lens vignetting 90 in real time by communicating with the barrel control section 18, and supplies the acquired information to the saturation handling process section 52.

Alternatively, the camera control section 14 may calculate the predicted output values from the information regarding the lens vignetting 90 and supply the calculated predicted output values to the saturation handling process section 52.

In any case, the saturation handling process section 52 is able to acquire the predicted output values from the information regarding the light receiving angle characteristics of the imaging element 7 and the lens vignetting 90.

Figure 16:
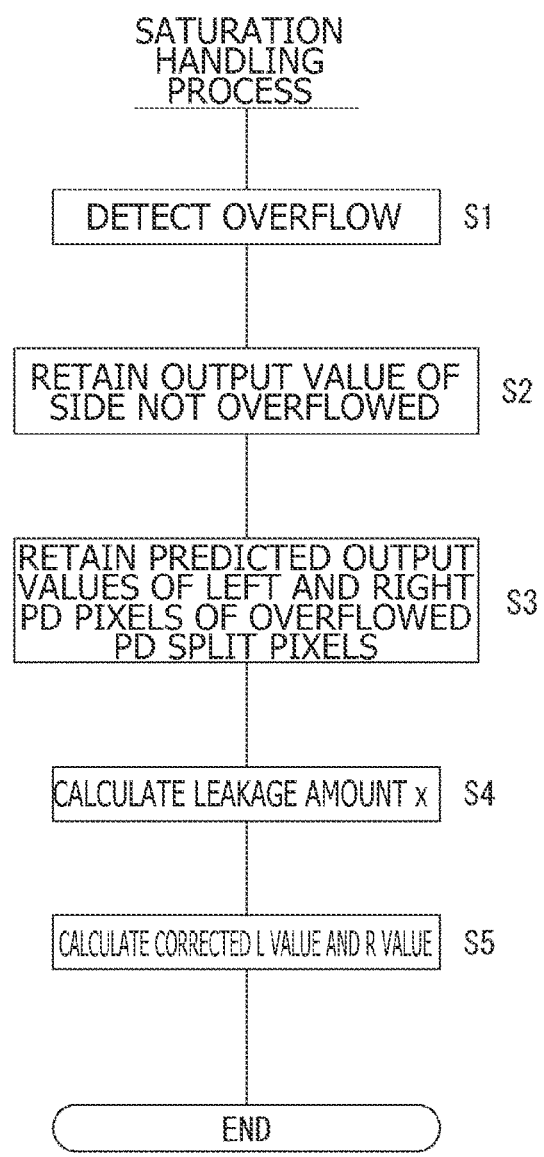
FIG. 16 is a flowchart illustrating the saturation handling process according to the embodiment.

Accordingly, the saturation handling process section 52 specifically performs the saturation handling process in a manner illustrated in FIG. 16.

In step S1, the saturation handling process section 52 detects an overflow. The reason is that detecting overflowed PD split pixel 40 makes it possible to determine that the saturation handling process is required for the PD split pixel 40. More specifically, in a case where the output value of the L or R value is at the overflow level, it can be determined that an overflow has occurred.

For example, in a case where the output value is a 12-bit value and the maximum value, such as "FFF" in hexadecimal notation, is reached, it can be determined that an overflow has occurred.

If the L and R values at the pixel address [i] are L_PD[i] and R_PD[i], respectively, as described with reference to FIG. 13, and L_PD[i]=0×FFF or R_PD[i]=0×FFF (0× represents the hexadecimal notation), it can be determined that an overflow has occurred in the pixel at such a pixel address.

However, it should be noted that the overflow level need not necessarily be the maximum value such as "0×FFF." A design may be formed in such a manner that an overflow occurs even when a voltage value is smaller than "0×FFF." In such a case, it is determined based on a defined overflow value whether an overflow has occurred.

In step S2 of FIG. 16, the saturation handling process section 52 retains (temporarily stores for computation) the output value of a non-overflowed PD pixel as a calculation value for use in later step S4. For example, in a case where the L value is overflowed, the saturation handling process section 52 considers that the L_PD[i] value is "0×FFF," which indicates the overflow level, but retains the output value (R value) of a non-overflowed right PD pixel 41R as R_PD[i] for the purpose of calculation.

In step S3, the saturation handling process section 52 retains the predicted output values of the left PD pixel 41L and the right PD pixel 41R regarding the overflowed PD split pixels 40 as calculation values for use in the later step S4.

Predicted output value of right PD pixel
    41$R$=$R$_PD_Pre[$i$]

Predicted output value of left PD pixel
    41$L$=$L$_PD_Pre[$i$]

In step S4, the saturation handling process section 52 determines the amount of leakage x. In this case, the amount of leakage x is determined from the following equation.

($L$_PD[$i$]+$x$)/($R$_PD[$i$]−$x$)=$L$_PD_Pre[$i$]/$R$_PD_Pre[$i$]

The reason why the above equation is used is that the amount of leakage x is supposed to be equivalent to the ratio between the predicted output values.

After the amount of leakage x is determined, the saturation handling process section 52 proceeds to step S5 and corrects the L value and the R value.

It can be said that the amount of leakage x is the difference value between the predicted output value of the overflowed PD pixel and the saturation value (overflow level).

Accordingly, when the corrected L and R values are L_PD_New_[i] and R_PD_New[i], respectively, it is supposed that the following equations are obtained.

$L$_PD_New[$i$]=$L$_PD[$i$]+$x$ $R$_PD_New[$i$]=$R$_PD[$i$]−$x$

The saturation handling process is as described above. Performing the saturation handling process determines the original L and R values prevailing when no overflow occurs.

In a case where the left-right PD pixel pupil imbalance correction is made on the above-mentioned corrected L and R values, proper correction results are obtained as depicted in FIG. 12B, so that the degradation of AF accuracy can be prevented.

3. AF CONTROL PROCESS

An AF control process will now be described with reference to FIG. 17.

Figure 17:
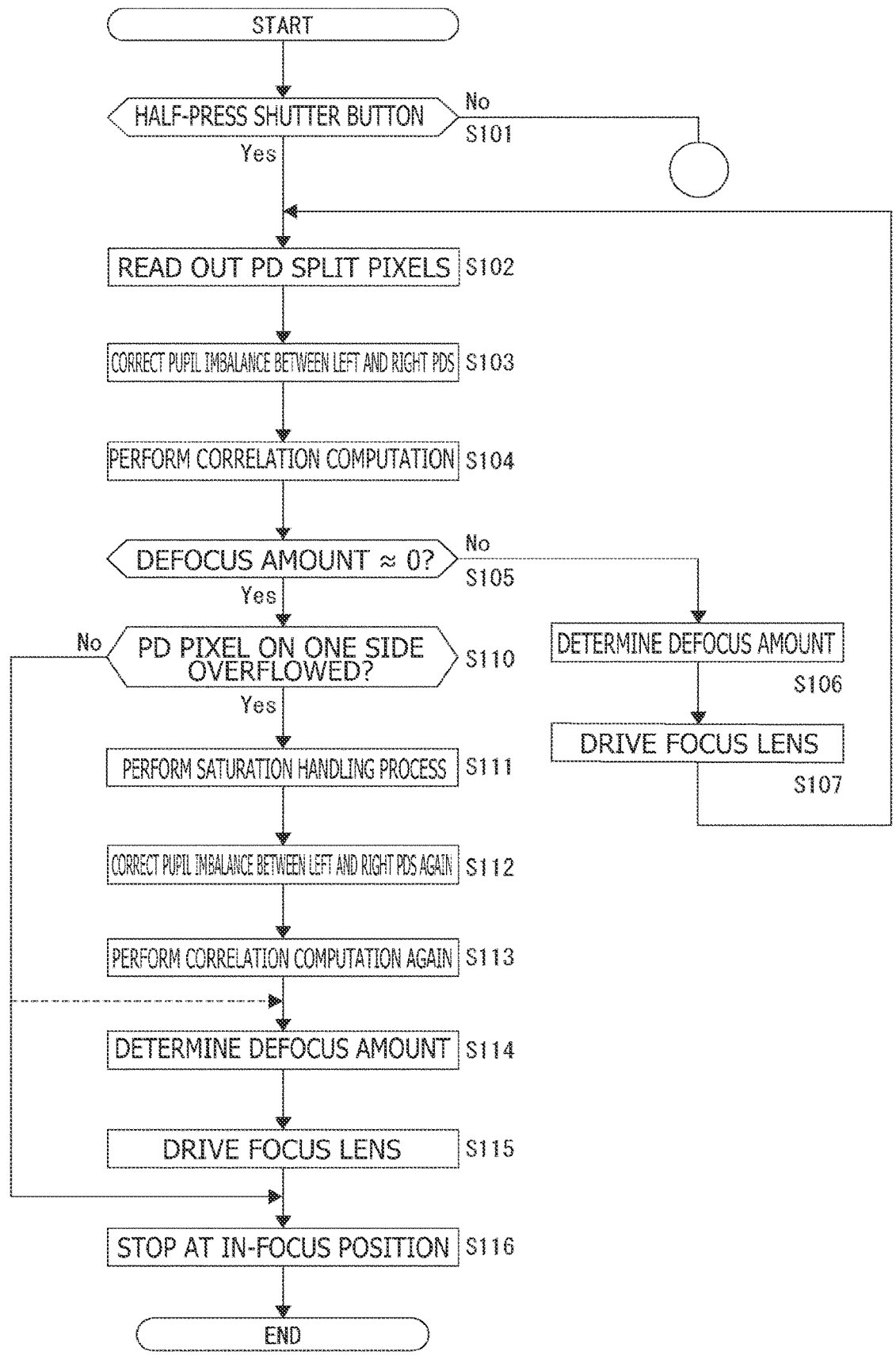
FIG. 17 is a flowchart illustrating an AF control process according to the embodiment.

In step S101 of FIG. 17, the camera control section 14 monitors whether the shutter button 6S is half-pressed. While the shutter button 6S is not half-pressed, a process other than depicted in FIG. 17 is performed.

When the shutter button 6S is half-pressed, the processing depicted in FIG. 17 proceeds to steps S102 and beyond.

More specifically, the camera control section 14 instructs the camera signal processing section 8 to calculate the defocus amount DF. However, the camera control section 14 does not issue the control signal SON for performing the saturation handling process.

Consequently, the camera signal processing section 8 determines the defocus amount without performing the saturation handling process. The camera signal processing section 8 reads out the PD split pixels 40 in step S102, makes the left-right PD pixel pupil imbalance correction in step S103, and performs correlation computation in step S104. The defocus amount DF obtained in the above manner is supplied to the camera control section 14.

In step S105, the camera control section 14 determines whether or not the defocus amount DF is nearly zero, that is, whether or not the in-focus state is nearly achieved. For example, the camera control section 14 determines whether or not the defocus amount DF is equal to a value within a certain range close to zero (a value almost representative of the in-focus state).

Alternatively, in step S105, the camera control section 14 may determine whether or not the defocus amount is DF=0.

If the defocus amount DF is not ≈0, the camera control section 14 determines the defocus amount DF in step S106, and provides focus lens drive control in step S107 according to the determined defocus amount DF. Upon completion of step S107, the camera control section 14 returns to step S102.

Consequently, the camera signal processing section 8 obtains the defocus amount DF at the next timing, and the camera control section 14 determines in step S105 whether or not the defocus amount is DF≈0.

Normal AF control, which is provided in a manner described above, is exercised to drive the focus lens while successively determining the defocus amount DF, and move the focus lens to a lens position where the defocus amount is DF=0.

Consequently, the focus lens is controlled so as to be positioned in the in-focus state, and at a certain point of time, it is determined in step S105 that the defocus amount is DF≈0 (or DF=0).

In the above case, the camera control section 14 proceeds to step S110, and then the processing branches depending on whether or not an overflow has occurred in the AF control process exercised thus far.

If no overflow has occurred, the accuracy of the defocus amount DF should remain undegraded in the AF control exercised thus far; therefore, the focus lens should have been moved and placed in the in-focus position. Consequently, the camera control section 14 proceeds to step S116, considers that the focus lens is in the in-focus position, and stops the movement of the focus lens. It should be noted that this operation is suitable for a case where the state where the defocus amount DF≈0 is regarded as the in-focus state and permissible.

In a case where no overflow has occurred in a situation where the camera control section 14 proceeds to step S105 when the defocus amount DF is DF≈0 but not exactly DF=0, the camera control section 14 may proceed from step S110 to steps S114 and S115 as indicated by the dashed line, move the focus lens finally based on the above-mentioned defocus amount DF, consider that the focus lens is in the in-focus position, and stops the movement of the focus lens.

It should be noted that a value defining the range where the defocus amount DF is DF≈0 should be stored as a parameter by the camera control section 14.

Meanwhile, if an overflow has occurred during the AF control process performed until the defocus amount is DF≈0 (or DF=0), the accuracy of the defocus amount DF might have decreased.

Accordingly, in steps S111 and beyond, the camera signal processing section 8 instructs the camera signal processing section 8 to calculate the defocus amount DF. In this instance, the control signal SON is issued for performing the saturation handling process.

Consequently, the camera signal processing section 8 performs the saturation handling process, and then determines the defocus amount DF. The camera signal processing section 8 performs the saturation handling process in step S111 on the L and R values, which have been read out immediately before in step S102, makes the left-right PD pixel pupil imbalance correction again in step S112, and performs correlation computation again in step S113 to obtain the defocus amount DF.

The camera control section 14 determines the defocus amount DF in step S114 and provides focus lens drive control in step S115 according to the determined defocus amount. Subsequently, in step S116, the camera control section 14 stops the movement of the focus lens.

In the above-described processing, first of all, AF control is provided without performing the saturation handle process so as to more or less approach the in-focus state. Subsequently, when the result of correlation computation indicates that the defocus amount is DF≈0 in a case where overflowed pixel is generated, the saturation handling process is first performed, and then correlation computation is performed again to perform a process of moving the focus lens for fine adjustment purposes.

It can be said that the saturation handling process is a process of returning the amount of electric charge (the amount of leakage x), which has leaked from the overflowed PD pixel into the other PD pixel, to the output value of the overflowed PD pixel. That is, it is assumed that the amount of leakage x is to be intrinsically added to the output value of the overflowed PD pixel.

Now, consideration of the correlation computation described with reference to FIGS. 7, 8A, 8B, and 8C reveal the fact that the waveform of the L value, which represents the left PD pixel output 60L, and the waveform of the R value, which represents the right PD pixel output 60R, are displaced from each other when the in-focus state is not reached, and gradually overlap with each other when the lens approaches the in-focus state.

When the waveforms are displaced from each other, it means that the right PD pixel 41R and left PD pixel 41L in one PD split pixel 40 receive different subject light. Meanwhile, when the waveforms overlap with each other, it means that the right PD pixel 41R and the left PD pixel 41L receive the same subject light.

Stated differently, when the focus lens is not in the in-focus state and the left PD pixel output 60L and the right PD pixel output 60R differ in phase, no one can tell whether the difference between the L value and the R value is influenced by the amount of leakage x or by the difference in the subject. That is, the amount of leakage x cannot be accurately calculated. Therefore, it can be said that the saturation handling process properly functions in the in-focus state or in a state close to the in-focus state.

Consequently, in the processing depicted in FIG. 17, AF control is provided without performing the saturation handling process before the in-focus state is approached. Subsequently, if an overflow has occurred when the focus lens roughly approaches the in-focus state, the saturation handling process is performed, and then the defocus amount DF is obtained again to provide AF control for fine adjustment purposes.

4. SUMMARY AND MODIFICATIONS

The above-described embodiment provides advantages described below.

The imaging apparatus 1 according to the embodiment includes the imaging element 7 having the PD split pixels 40. The PD split pixel 40 includes the left PD pixel 41L (first PD pixel) and the right PD pixel 41R (second PD pixel), which output different pixel signals, respectively. The imaging apparatus 1 further includes the camera signal processing section 8, which performs the saturation handling process in a case where the output values of the pixel signals reach the saturation values (overflow levels). The saturation handling process is performed to correct the output values according to the saturation values and the predicted output values.

This optimizes the output values of the left PD pixel 41L and the right PD pixel 41R in the PD split pixel 40, and thus increases the accuracy of the defocus amount DF to provide improved AF performance.

It should be noted that the saturation handling process according to the embodiment corrects both the output value of an overflowed PD pixel and the output value of a PD pixel to which the amount of leakage x is added. Alternatively, however, the saturation handling process may correct only one of the above-mentioned two output values. It is conceivable that the saturation handling process may be performed, for example, to correct the output value reaching a clip level to its original value or correct the output value affected by the leakage to an output value unaffected by the leakage.

The saturation handling process according to the embodiment includes a process of calculating the difference value between the predicted output values and the saturation values.

Level changes caused by an overflow can be estimated from the difference between the predicted output values and the saturation values. Correcting the output values (L value and R value) on the basis of the estimated level changes makes it possible to restore the original output values prevailing in a situation where no overflow has occurred.

The saturation handling process according to the embodiment calculates the difference value between the predicted output value and the saturation value regarding one PD pixel of the left PD pixel 41L and the right PD pixel 41R.

In a case where an attempt is made to cope with an overflow occurring in one PD pixel of the left PD pixel 41L and the right PD pixel 41R of the PD split pixel 40, the difference between the predicted output value and the saturation value regarding one PD pixel of the PD split pixel 40 should be determined. Correcting the output values based on the determined difference ensures that the original output value prevailing in a situation where no overflow has occurred can be restored as the output value of an overflowed PD pixel.

In the saturation handling process according to the embodiment, the difference value calculated for one of the PD pixels is not only added to the output value of the one of the PD pixels but also subtracted from the output value of the other PD pixel.

Depending on the overflow occurring in one of the left PD pixel 41L and the right PD pixel 41R of the PD split pixel 40, an electric charge overflow from the one PD pixel leaks into the other PD pixel. Due to this structure, all the output values of the PD split pixel 40 can be accurately maintained. In this case, the output values of the individual PD pixels can be corrected so as to return the leakage to its original place by adding the difference value to an overflowed PD pixel and subtracting the difference value from the other PD pixel. This makes it possible to optimize the output values of the left PD pixel 41L and the right PD pixel 41R and thus increase the accuracy of AF operation.

The imaging apparatus 1 according to the embodiment includes the camera control section 14 that determines whether the in-focus state is reached, and depending on whether the in-focus state is reached, causes the camera signal processing section 8 to perform the saturation handling process.

That is, in the AF control, when the in-focus state is roughly approached, the saturation handling process is performed (see FIG. 16).

In a situation where light from the same subject is incident on the left PD pixel 41L and the right PD pixel 41R of the PD split pixel 40, an electric charge leaking from one PD pixel into the other PD pixel forms an image of the same subject. Therefore, no problems occur when the saturation handling process (adding the amount of leakage x to one output value and subtracting the amount of leakage x from the other output value) is performed. However, in a situation where light from different subjects is incident on the left PD pixel 41L and the right PD pixel 41R, the electric charge is associated with different subject light. Therefore, this situation is not appropriate for performing the saturation handling process. Consequently, the saturation handling process is performed in a state close to the in-focus state where the same subject light is incident on the left PD pixel 41L and the right PD pixel 41R. This properly produces the effect of the saturation handling process.

In the embodiment, it is assumed that the camera control section 14 exercises AF control based on the defocus amount DF obtained by using the L and R values in a state where the camera signal processing section 8 is not allowed to perform the saturation handling process, then after an in-focus condition (DF≈0) is satisfied, exercises AF control based on the defocus amount DF obtained by using the L and R values in a state where the camera signal processing section 8 is allowed to perform the saturation handling process (see FIG. 16).

When AF control is exercised based on the defocus amount that is obtained in a state where the saturation handling is not performed, the focus lens approaches the in-focus state. In such a resulting state, the same subject light is incident on the left PD pixel 41L and the right PD pixel 41R. As a result, performing the saturation handling process makes it possible to properly determine the leakage and correct the output values. Consequently, AF control can be provided for fine adjustment purposes. This dramatically increases the AF accuracy.

In the embodiment, it is assumed that the predicted output values are obtained based on the light receiving angle characteristics of the left PD pixel 41L and the right PD pixel 41R and on the lens information.

Using the above-mentioned predicted output values makes it easy to obtain the value of difference from the saturation value in the event of an overflow of each pixel. The light receiving angle characteristics are known, and thus should be stored in the memory section 15. Further, lens vignetting information regarding various lens types should be additionally stored. As a result, proper predicted output values can be obtained to perform the saturation handling process.

It is assumed that the imaging apparatus 1 according to the embodiment is an imaging apparatus to which the lens barrel 3 of a replaceable type can be attached, and is configured to receive the lens information from the lens barrel 3.

Consequently, even in a case where the adopted lens is of a replaceable type, appropriate predicted output values based on the lens barrel 3 can be used.

It should be noted that the foregoing description deals with an example in which the imaging apparatus 1 is of a lens replacement type. However, the technology according to the embodiment is also applicable to an imaging apparatus integral with a lens. In a case where the imaging apparatus integral with a lens is used, the camera control section 14 is able to grasp, for example, the information regarding the lens vignetting 90 and the F-number, so that the predicted output values should be determined based on such information.

The camera signal processing section 8 in the embodiment has been described with reference to an example where the pupil imbalance correction is made on the output values of the left PD pixel 41L and the right PD pixel 41R in order to flatten output value fluctuations due to the image height.

While AF control is exercised by using the output values of the left PD pixel 41L and the right PD pixel 41R, the pupil imbalance correction can be made to avoid the influence of the H image height.

It is assumed that the camera signal processing section 8 in the embodiment makes the pupil imbalance correction on the output values of the left PD pixel 41L and the right PD pixel 41R after they have been subjected to the saturation handling process.

Consequently, it is possible to prevent the pupil imbalance correction from being excessively made in a state where the output values of the left PD pixel 41L and the right PD pixel 41R are decreased by the amount of overflow or increased as a result of the leakage. This provides increased signal accuracy.

It should be noted that the advantages described in this document are merely illustrative and not restrictive. The present technology may additionally provide advantages other than those described in this document.

The present technology may adopt the following configurations as well.

(1)

An imaging apparatus including:
  an imaging element that includes photodiode split pixels, the photodiode split pixels each including a first photodiode pixel and a second photodiode pixel, the first photodiode pixel and the second photodiode pixel outputting different pixel signals, respectively; and
  a signal processing section that, in a case where output values of the pixel signals reach saturation values, performs a saturation handling process of correcting the output values according to the saturation values and predicted output values.

(2)

The imaging apparatus according to (1),
  in which the saturation handling process includes a process of calculating difference values between the predicted output values and the saturation values.

(3)

The imaging apparatus according to (1) or (2),
  in which the saturation handling process calculates the difference value between the predicted output value and the saturation value regarding one photodiode pixel of the first photodiode pixel and the second photodiode pixel.

(4)

The imaging apparatus according to (3),
  in which the saturation handling process is performed to add the difference value calculated from one of the photodiode pixels to the output value of the one of the photodiode pixels, and
    subtract the difference value from the output value of the other photodiode pixel.

(5)

The imaging apparatus according to any one of (1) to (4), further including:
  a control section that determines whether an in-focus state is reached, and depending on whether the in-focus state is reached, causes the signal processing section to perform the saturation handling process.

(6)

The imaging apparatus according to (5),
  in which the control section
    exercises autofocus control on the basis of a defocus amount obtained by using the output value of the first photodiode pixel and the output value of the second photodiode pixel in a state where the signal processing section is not allowed to perform the saturation handling process, and
    then after an in-focus condition is satisfied, exercises autofocus control on the basis of the defocus amount obtained by using the output value of the first photodiode pixel and the output value of the second photodiode pixel in a state where the signal processing section is allowed to perform the saturation handling process.

(7)

The imaging apparatus according to any one of (1) to (6),
  in which the predicted output values are determined based on the light receiving angle characteristics of the first photodiode pixel and the second photodiode pixel and on lens information.

(8)

The imaging apparatus according to (7),
  in which the imaging apparatus is an imaging apparatus to which a lens barrel of a replaceable type is attachable, and
    the lens information is received from the lens barrel.

(9)

The imaging apparatus according to any one of (1) to (8),
  in which the signal processing section makes pupil imbalance correction on the output value of the first photodiode pixel and the output value of the second photodiode pixel in order to flatten output value fluctuations due to an image height.

(10)

The imaging apparatus according to (9),
  in which the signal processing section makes the pupil imbalance correction on the output value of the first photodiode pixel and the output value of the second photodiode pixel that have been subjected to the saturation handling process.

(11)

A signal processing method that is used by an imaging apparatus including an imaging element, the imaging element including photodiode split pixels, the photodiode split pixels each including a first photodiode pixel and a second photodiode pixel, the first photodiode pixel and the second photodiode pixel outputting different pixel signals, respectively, the signal processing method including:
  when the output values of the pixel signals reach saturation values, performing a saturation handling process of correcting the output values according to the saturation values and predicted output values.

REFERENCE SIGNS LIST

1: Imaging apparatus
2: Camera housing
3: Lens barrel
6S: Shutter button
7: Imaging element
8: Camera signal processing section
14: Camera control section
40: PD split pixels
41L: Left PD pixel
41R: Right PD pixel

The invention claimed is:

1. An imaging apparatus, comprising:
an imaging element that includes a plurality of photodiode split pixels, wherein each of the plurality of photodiode split pixels includes
a first photodiode pixel and a second photodiode pixel,
the first photodiode pixel is configured to output a first pixel signal,
the second photodiode pixel is configured to output a second pixel signal, and
the first pixel signal is different from the second pixel signal; and
a signal processing section configured to execute, based on a first output value of the first pixel signal and a second output value of the second pixel signal that reach saturation values, a saturation handling process to correct the first output value and the second output value, wherein
the correction of the first output value and the second output value is based on the saturation values and predicted output values,
the saturation handling process includes calculation of a plurality of difference values between the predicted output values and the saturation values,
each difference value of the plurality of difference values corresponds to a reduction in an amount of electric charge based on an overflow in the first photodiode pixel, and
the electric charge is generated in each of the first photodiode pixel and the second photodiode pixel.

2. The imaging apparatus according to claim 1,
wherein a difference value of the plurality of difference values is calculated between a predicted output value of the predicted output values and a saturation value of the saturation values of one of the first photodiode pixel or the second photodiode pixel.

3. The imaging apparatus according to claim 2, wherein the saturation handling process further includes
addition of the difference value to the first output value, and
subtraction of the difference value from the second output value.

4. The imaging apparatus according to claim 1, further comprising:
a control section configured to:
determine that an in-focus state is reached; and
control, based on the determination that the in-focus state is reached, the signal processing section to execute the saturation handling process.

5. The imaging apparatus according to claim 4, wherein the control section is further configured to:
exercise autofocus control based on a defocus amount, wherein
the defocus amount is obtained from the first output value and the second output value, and
the autofocus control is exercised in a state where the signal processing section is not allowed to execute the saturation handling process; and
exercise, in a state where the signal processing section is allowed to execute the saturation handling process, the autofocus control based on satisfaction of an in-focus condition and the defocus amount.

6. The imaging apparatus according to claim 1, further comprising:
calculation of the predicted output values based on light receiving angle characteristics of the first photodiode pixel and the second photodiode pixel, and lens information.

7. The imaging apparatus according to claim 6, wherein
the imaging apparatus is an apparatus to which a lens barrel of a replaceable type is attachable, and
the imaging apparatus is further configured to receive the lens information from the lens barrel.

8. The imaging apparatus according to claim 1,
wherein the signal processing section is further configured to execute pupil imbalance correction on the first output value and the second output value to flatten output value fluctuations due to an image height.

9. The imaging apparatus according to claim 8,
wherein the signal processing section is further configured to execute the pupil imbalance correction on the first output value and the second output value that have been subjected to the saturation handling process.

10. A signal processing method, comprising:
outputting, by a first photodiode pixel of a plurality of photodiode split pixels, a first pixel signal, wherein
the plurality of photodiode split pixels is included in an imaging element of an imaging apparatus;
outputting, by a second photodiode pixel of the plurality of photodiode split pixels, a second pixel signal, wherein
the first pixel signal is different from the second pixel signal; and
executing, by a signal processing section of the imaging apparatus, a saturation handling process of correcting a first output value of the first pixel signal and a second output value of the second pixel signal, based on a determination that each of the first output value and the second output value reaches saturation values, wherein
the correction of the first output value and the second output value is based on the saturation values and predicted output values,
the saturation handling process includes calculation of a plurality of difference values between the predicted output values and the saturation values,
each difference value of the plurality of difference values corresponds to a reduction in an amount of electric charge based on an overflow in the first photodiode pixel, and
the electric charge is generated in each of the first photodiode pixel and the second photodiode pixel.

* * * * *